United States Patent
Ata et al.

(10) Patent No.: US 6,449,557 B2
(45) Date of Patent: Sep. 10, 2002

(54) DEVICE AND METHOD FOR CHANGING MAP INFORMATION

(75) Inventors: Teruaki Ata, Osaka; Hiroyuki Hamada, Yawata; Atsushi Yamashita, Osaka; Kiyomi Sakamoto, Ikoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/781,152

(22) Filed: Feb. 13, 2001

(30) Foreign Application Priority Data

Feb. 14, 2000 (JP) ........................................ 2000-035774

(51) Int. Cl.⁷ .............................................. G01C 21/32
(52) U.S. Cl. .................... 701/208; 701/209; 701/210; 701/211; 701/212; 340/988; 340/990
(58) Field of Search ................................ 701/200, 201, 701/202, 205, 206, 208, 209, 210, 211, 212; 73/178 R; 340/988, 990, 995

(56) References Cited

U.S. PATENT DOCUMENTS 6,144,318 A * 11/2000 Hayashi et al. .............. 340/995
6,169,552 B1 * 1/2001 Endo et al. .................. 345/427

FOREIGN PATENT DOCUMENTS

| JP | 05-061927 | 3/1993 |
| JP | 2000-105128 | 4/2000 |

* cited by examiner

*Primary Examiner*—Gertrude Arthur
(74) *Attorney, Agent, or Firm*—Wenderoth, Lind & Ponack, L.L.P.

(57) ABSTRACT

A map information storage stores map information including roads, landmarks, and areas. An overlap determination unit determines whether a landmark and an area overlap with a road in consideration of a road and its width. A position changer moves the overlapping landmark and area to positions where they do not overlap with the road on width display. A changed map information storage stores map information including changed positional information of the landmarks and the areas. If the changed map information is displayed on a screen, the landmarks and the areas are displayed so as not to overlap with roads on width display.

28 Claims, 23 Drawing Sheets

DEVICE AND METHOD FOR CHANGING MAP INFORMATION

BACKGROUND OF THE INVENTION

1. Field of the Invention

The present invention relates to devices and methods for changing positions of landmarks, areas, or roads included in map information and, more specifically, to a device and method for automatically changing these positions so that the landmarks and areas do not overlap with each road displayed with a road width.

2. Description of the Background Art

Navigation devices for vehicles provide users with guidance to a destination by displaying map information stored in a storage medium, such as CD-ROM, on a screen. Such map information includes road network information, and also various facility information and area information. Facilities to be displayed on a map include post offices, convenience stores, and gas stations, for example. Areas to be displayed include seas, parks, and city blocks, for example. When the map information is displayed on a screen, the facilities are displayed as "landmarks" represented by graphics, characters, or a combination of both. The areas are defined by polygons. Hereinafter, the landmarks and the areas included in the map information are collectively referred to as "objects". Vehicle navigation devices are intended to provide users with guidance to a destination by appropriately displaying road network information and object information both included in map information.

Conventional vehicle navigation devices display map information as a plain view or a perspective view from the top. Most of these devices display roads each as a line segment having a negligible width, without reflecting their actual road widths. Such display is hereinafter referred to as "zero-width display". For vehicle navigation devices carrying out zero-width display, map information is generated to support zero-width display. Therefore, as shown in FIG. 27a, roads and objects can be simultaneously displayed while almost keeping the actual positional relation therebetween. Thus, there do not exist significant problems on a display screen.

On the other hand, for better destination guidance to users, some vehicle navigation devices may display each road with its own road width. Such display is hereinafter referred to as "width display". Such width display is adopted especially by vehicle navigation devices carrying out three-dimensional display of roads each provided with height. The reason is that displaying roads each provided only with height causes a difficulty for users in recognizing the shape of the roads. To reduce such difficulty, width display is very effective. For width display, however, enormous amount of data is required as the map information. Therefore, the existing map information for zero-width display is preferably used for width display without generating another map information.

However, if the map information for zero-width display is used for width display, the roads and objects may overlap each other, as shown in FIG. 27b. In FIG. 27b, a landmark that represents a post office and an area are displayed on a screen, overlapping with a road with a road width. Such display screen is quite awkward for users, who expect reality in road display.

One solution to the above problem is to generate another map information dedicated to width display. However, such map information is enormous in volume, as stated above, and therefore the existing map information for zero-width display is preferably used for generating new map information. Also, for devices capable of switching between width display and zero-width display by user's selection or capable of switching the road width to another one for display, it is preferable that only single map information is commonly used for every case without having plural map information.

SUMMARY OF THE INVENTION

Therefore, an object of the present invention is to provide a device and method for automatically changing a position of an object or a road on a map so that the object does not overlap with the road displayed with a road width.

The present invention has the following features to achieve the object mentioned above.

A first aspect of the present invention is directed to a map information changing device for changing positions of landmarks and areas included in map information, the device including: a map information storage for storing the map information at least related to roads, the landmarks, and the areas; an overlap determination unit for determining whether the landmark and the area included in the map information overlap with the road included in the map information and displayed with a road width; a position changer for changing positional information of the landmark and the area determined by the overlap determination unit as overlapping with one or more roads by moving each of the landmark and the area to a position at which each of the landmark and the area does not overlap with the one or more roads displayed with the road width, while keeping each location side of the landmark and the area with respect to a center line of each road; and a changed map information storage for storing the map information and the positional information of the landmark and the area changed by the position changer.

In such map information changing device, the landmark and the area are changed in position so as not to overlap with the roads displayed with the road width, while keeping each location side of the landmark and the area with respect to the center line of each road. Therefore, when the map information is displayed on a screen with the road width based on the original map information and the changed positional information, the landmark and the area are displayed so as not to overlap with the road. Thus, a realistic screen can be presented to the user.

In this case, the position changer may move the landmark or each vertex of the area away from the center line of each of the one or more roads. To move each vertex of the area, the position changer may deform the area in a direction away from the center line of each of the one or more roads, or may translate the area away from the center line of each of the one or more roads. According to the area deforming method, the area is deformed to be reduced in size. Such reduced area will not cause another overlap with a road, and therefore only one process is enough for each road. Consequently, it is possible to change the positional information with a small amount of calculation. On the other hand, according to the areas moving method, the area is moved as keeping its shape. Therefore, it is possible to prevent the user from erroneously recognizing the shape of the area.

According to a second aspect of the present invention, in the first aspect, the map information changing device further includes a map information display unit for displaying, on a screen, the changed map information stored in the changed map information storage with the road width. In such a map information changing device, the roads, landmarks and areas are displayed on a screen based on the original map information and the changed positional information. The landmark and the area are displayed so as not to overlap with the road. Thus, a realistic screen can be presented to the user.

In this case, the overlap determination unit and the position change unit may switch the road width to another road width based on an input from a user. Thus, even if the road width is switched based on the selection by the user, the landmark and the area are always displayed so as not to overlap with the roads. Therefore, a realistic screen can be presented to the user without requiring a plurality of map information provided in advance.

Furthermore, if the map information changing device equipped with the map information display unit is incorporated in a navigation device, the landmark and the area are displayed so as not to overlap with the roads displayed with the road width. Therefore, a realistic screen can be presented to the user.

A third aspect of the present invention is directed to a method for changing positions of landmarks and areas included in map information, the method including the steps of: storing the map information at least related to roads, the landmarks, and the areas; determining whether the landmark and the area included in the map information overlap with the road included in the map information and displayed with a road width; changing positional information of the landmark and the area determined in the overlap determining step as overlapping with one or more roads by moving each of the landmark and the area to a position at which each of the landmark and the area does not overlap with the one or more roads displayed with the road width, while keeping a location side of each of the landmark and the area with respect to a center line of each road; and storing the map information and the positional information of the landmark and the area changed in the positional information changing step.

In such a map information changing method, the landmark and the area are changed in position so as not to overlap with the roads displayed with the road width, while keeping each location side of the landmark and the area with respect to the center line of each road. Therefore, when the map information is displayed on a screen with the road width based on the original map information and the changed positional information, the landmark and the area are displayed so as not to overlap with the road. Thus, a realistic screen can be presented to the user.

In this case, in the positional information changing step, the landmark or each vertex of the area may be moved away from the center line of each of the one or more roads. To move each vertex of the area, in the positional information changing step, the area may be deformed in a direction away from the center line of each of the one or more roads, or translated away from the center line of each of the one or more roads. According to the area deforming method, the area is deformed to be reduced in size. Such reduced area will not cause another overlap with roads, and therefore only one process is enough for each road. Consequently, it is possible to change the positional information with a small amount of calculation. On the other hand, according to the area moving method, the area is moved as keeping its shape. Therefore, it is possible to prevent the user from erroneously recognizing the shape of the area.

A fourth aspect of the present invention is directed to a map information changing device for changing positions of roads included in map information, the device including: a map information storage for storing the map information at least related to the roads, landmarks, and areas; an overlap determination unit for determining whether the road included in the map information and displayed with a road width overlaps with the landmark and the area included in the map information; a position changer for changing positional information of the road determined by the overlap determination unit as overlapping with one or more landmarks and areas by moving the road displayed with the road width to a position at which the road does not overlap with the one or more landmarks and areas, while keeping a location side of each of the landmarks and the areas with respect to a center line of the road; and a changed map information storage for storing the map information and the positional information of the road changed by the position changer.

In such a map information changing device, the road displayed with the road width is changed in position so as not to overlap with the landmark and the area. Therefore, when the map information is displayed on a screen with the road width based on the original map information and the changed positional information, the road is displayed so as not to overlap with the landmark and the area. Thus, a realistic screen can be presented to the user.

In this case, the position changer may move each endpoint of a segment composing the road away from the one or more landmarks and areas. Alternatively, the position changer may translate the road away from the one or more landmarks and areas. Also, the position changer may move one endpoint of the segment composing the road away from the one or more landmarks and areas. In either case, the road displayed with the road width is changed in position so as not to overlap with the landmark and the area. Therefore, when the map information is displayed on a screen with the road width based on the original map information and the changed positional information, the road is displayed so as not to overlap with the landmark and the area.

According to a fifth aspect of the present invention, in the fourth aspect, the map information changing device further includes a map information display unit for displaying, on a screen, the changed map information stored in the changed map information storage with the road width. In such map information changing device, the road, landmark, and area are displayed on a screen, based on the original map information and the changed positional information. The road is displayed so as not to overlap with the landmark and the area. Thus, a realistic screen can be presented to the user.

In this case, the overlap determination unit and the position changer may switch the road width to another road width based on an input from a user. Consequently, even if the road width is switched based on the selection by the user, the road is always displayed so as not to overlap with the landmark and the area. Therefore, a realistic screen can be presented to the user without requiring a plurality of map information provided in advance.

Furthermore, if the map information changing device equipped with the map information display unit is incorporated in a navigation device, the roads displayed with the road width are displayed so as not to overlap with the landmark and the area. Therefore, a realistic screen can be presented to the user.

A sixth aspect of the present invention is directed to a method for changing positions of roads included in map information, the method including the steps of: storing the map information at least related to the roads, landmarks, and areas; determining whether the road included in the map information and displayed with a road width overlaps with the landmark and the area included in the map information;

changing positional information of the road determined in the overlap determining step as overlapping with one or more landmarks and areas by moving the road displayed with the road width to a position at which the road does not overlap with the one or more landmarks and areas, while keeping a location side of each of the landmarks and the areas with respect to a center line of the road; and storing the map information and the positional information of the road changed in the positional information changing step.

In such a map information changing method, the road displayed with the road width is changed in position so as not to overlap with the landmark and the area. Therefore, when the map information is displayed on a screen with the road width based on the original map information and the changed positional information, the road is displayed so as not to overlap with the landmark and the area. Thus, a realistic screen can be presented to the user.

In this case, in the positional information changing step, each endpoint of a segment composing the road may be moved away from the one or more landmarks and areas. Alternatively, the road may be translated away from the one or more landmarks and areas. Also, one endpoint of the segment composing the road may be moved away from the one or more landmarks and areas. In either case, the road displayed with the road width is changed in position so as not to overlap with the landmark and the area. Therefore, when the map information is displayed, based on the original map information and the changed positional information, on a screen with the road width provided thereto, the road is displayed so as not to overlap with the landmark and the area.

These and other objects, features, aspects and advantages of the present invention will become more apparent from the following detailed description of the present invention when taken in conjunction with the accompanying drawings.

DESCRIPTION OF THE PREFERRED EMBODIMENTS (First Embodiment)

Figure 1:
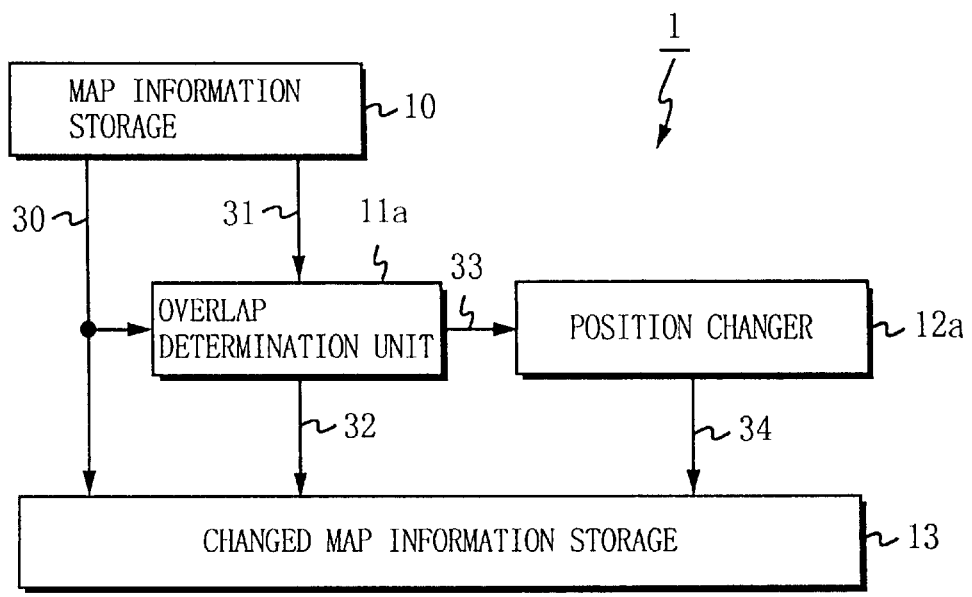
FIG. 1 is a block diagram showing the structure of a map information changing device according to a first embodiment of the present invention.

FIG. 1 is a block diagram showing the structure of a map information changing device 1 according to a first embodiment of the present invention. A map information changing device 1 automatically converts map information for zero-width display into the one for width display. The map information changing device 1 includes a map information storage 10, an overlap determination unit 11a, a position changer 12a, and a changed map information storage 13.

The map information storage 10 stores map information for zero-width display including information on road network and objects. For storing such map information, an arbitrary storage medium such as a cassette tape, CD-ROM, DAT, DVD, semiconductor memory, or IC memory (including RAM) is used. The map information storage 10 may be a unit connecting to the Internet, for example, and accessing to a remote storage medium.

As conventionally well known, in the road network information included in the map information, data on road network, intersections, and railroad network, and other data are represented as a combination of nodes and links. The road network information includes the number of road lanes and the number of railroad tracks Such number information is used by a road width calculator 20, which will be described later, for calculating the road width. For objects (landmarks and areas), the map information includes information on a position and attributes of each landmark, and information on a position of each area. The landmark attribute information is used by a size calculator 21, which will be described later, for calculating the size of the landmark. The map information may also include map information with various scales such as 1/12,500, 1/25,000, 1/100,000, and 1/400,000.

Figure 2:
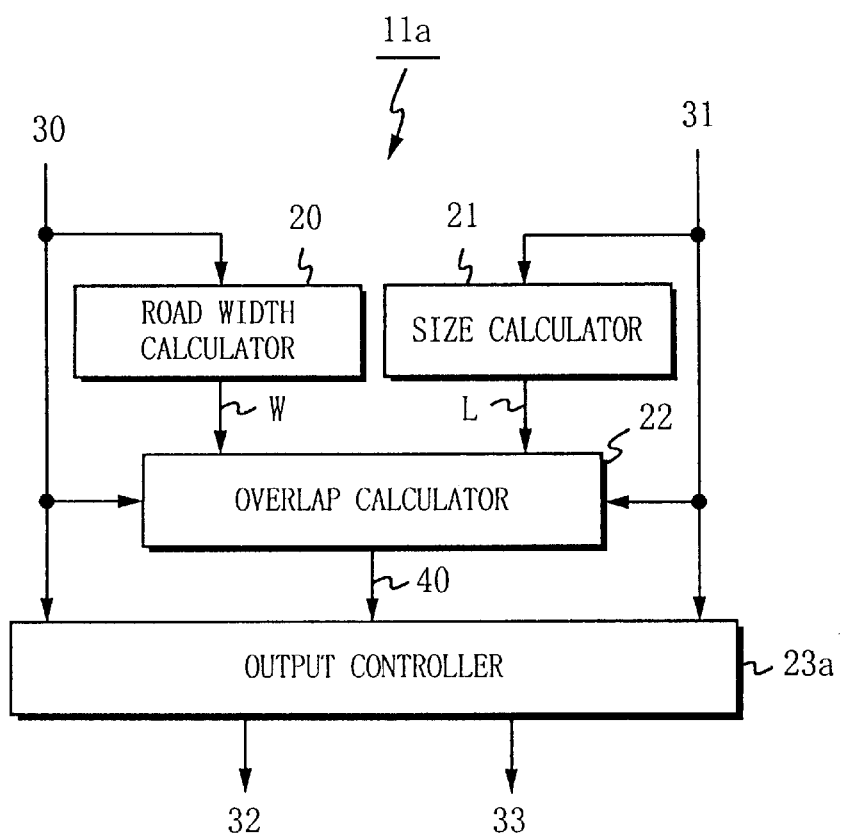
FIG. 2 is a block diagram showing the structure of an overlap determination unit 11a of a map information changing device 1 shown in FIG. 1.

FIG. 2 is a block diagram showing the structure of the overlap determination unit 11a in more detail. As shown in FIG. 2, the overlap determination unit 11a includes the road width calculator 20, the size calculator 21, an overlap calculator 22, and an output controller 23a.

The road width calculator 20 multiplies, for each road included in road network information 30, the number of lanes by a predetermined width for each lane. Based on the multiplication result, the road width calculator 20 produces a road width W. Here, the road width W is defined to be a distance between the center line of a road and one edge thereof. If the number of lanes is not given, the road width is assumed to be equal to the width of one lane. If the map information includes attribute information for a road, the width of the road not provided with the information of the number of lanes may be given based on that attribute information. For example, a road whose attribute indicates "highway" is given "2 lanes", while a road whose attribute indicates "private road" is given "1 lane".

The size calculator 21 calculates a size L of each object, based on the attribute information included in object information 31. In the present embodiment, landmarks are treated as a circle with a radius L, while areas are treated as having a boundary line 0 width. The size calculator 21 outputs the predetermined size L for each type of landmarks or the value 0 for each area.

The overlap calculator 22 receives the road network information 30 and the object information 31, and also the road width W calculated by the road width calculator 20 and the size L of the object calculated by the size calculator 21. The overlap calculator 22 calculates a distance D between the road and the object by using their positional information, which will be described later. Then, the overlap calculator 22 determines, based on the road width W, the size L, and the distance D, whether the road and the object overlap or not, and then produces a determination signal 40 indicating a determination result.

The output controller 23a is provided with the road network information 30, the object information 31, and the determination signal 40. Based on the determination signal 40, the output controller 23a selectively produces outputs as follows. That is, if the determination signal 40 indicates the object and the road overlap each other, the output controller 23a outputs position change information 33 including the positional information of the overlapping road and the object information 31. Otherwise, the output controller 23a outputs the object information 31 as it is as the object information 32.

The position changer 12a changes, based on the received position change information 33, the position of the object on the map to resolve the overlap between the object and the road. Then, the position changer 12a produces changed object information 34.

The changed map information storage 13 stores the road network information 30, the object information 32 provided by the overlap determination unit 11a, and the object information 34 provided by the position changer 12a. Composed of this information is the map information for width display. To store such map information, an arbitrary storage medium such as a cassette tape, CD-ROM, DAT, DVD, semiconductor memory or IC memory (including RAM) is used. The changed map information storage 13 may be a unit connecting to the Internet, for example, and accessing a remote storage medium.

Figure 3:
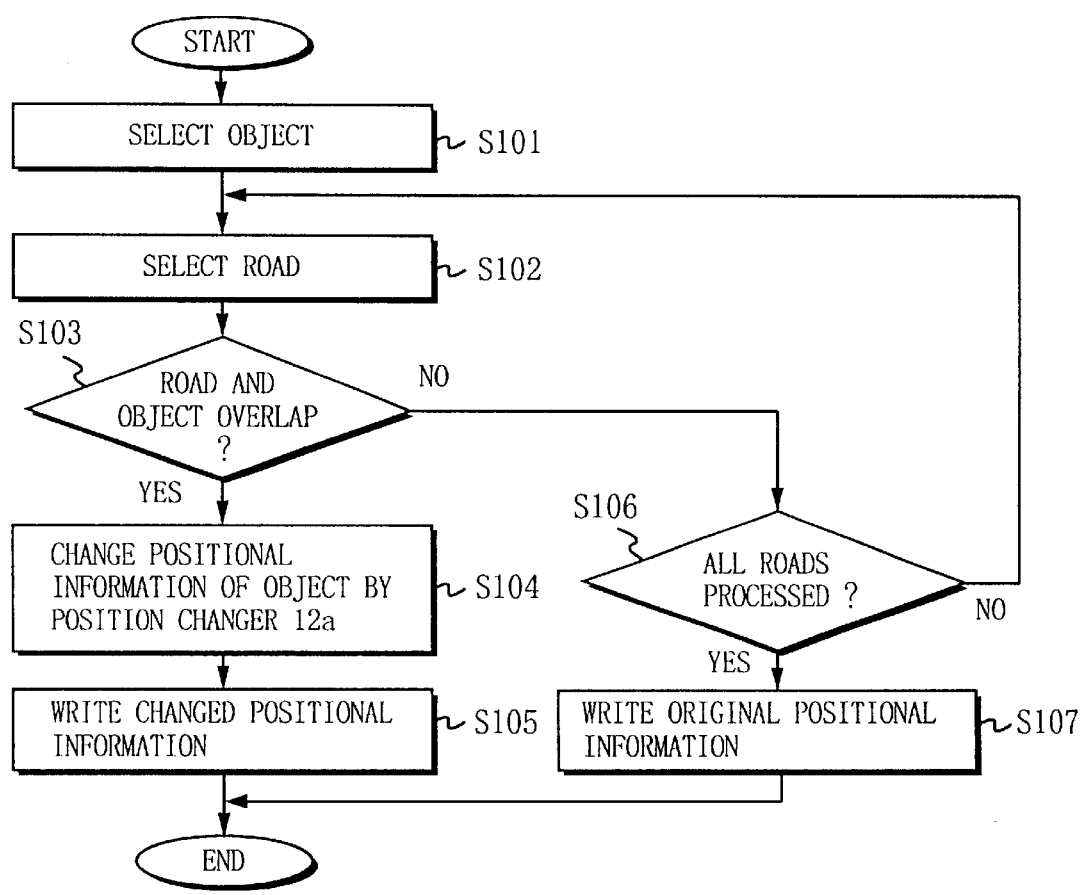
FIG. 3 is a flow chart showing the operation of the map information changing device 1 shown in FIG. 1.

The map information changing device 1 detects a road overlapping with a specific object, and then changes the object position. With reference to a flow chart shown in FIG. 3, the operation of the map information changing device (hereinafter simply referred to as "device") 1 carried out on a specific object is described. The device 1 selects an object from the map information for zero-width display stored in the map information storage 10 (step S101). Then, the device 1 selects a road (step S102). Then, the device 1 determines, by the overlap determination unit 11a, whether the selected object and road overlap each other or not (step S103). If they overlap each other, the procedure goes to step S104, and otherwise goes to step S106.

If determining instep S103 that they overlap each other, the device 1 calculates, by using the position changer 12a, the changed object information 34 (step S104). Then, the device 1 writes the changed object information 34 in the changed map information storage 13 (step S105). The process on the selected object is now completed.

If determining in step S103 that the object and the road do not overlap each other, the device 1 determines whether all roads have been processed or not (step S106). If any road has been unprocessed, the procedure returns to step S102. If all roads have been processed, it is determined that the selected object does not overlap with any roads. Therefore, the device 1 writes the object information 31 as it is in the changed map information storage 13 (step S107). The process on the selected object is now completed.

Figure 4:
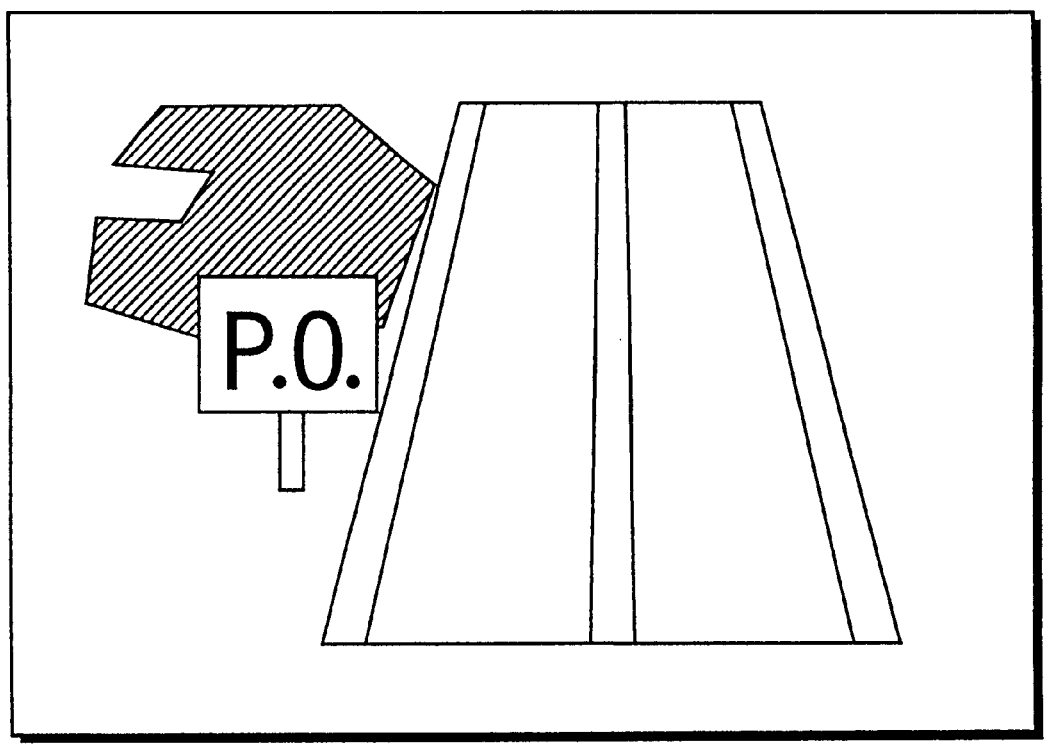
FIG. 4 is a diagram showing an example of a screen displayed by using map information changed by the map information changing device 1 shown in FIG. 1.

The obtained map information is used as the one for width display by a map information display device (not shown) in a vehicle navigation device, for example. In this map information, the objects are changed in position so as not to overlap with any roads on width display. Therefore, as shown in FIG. 4, the vehicle navigation device using this map information can display the objects so that they do not overlap with any roads, and thus can present a realistic screen to the user.

Figure 5A:
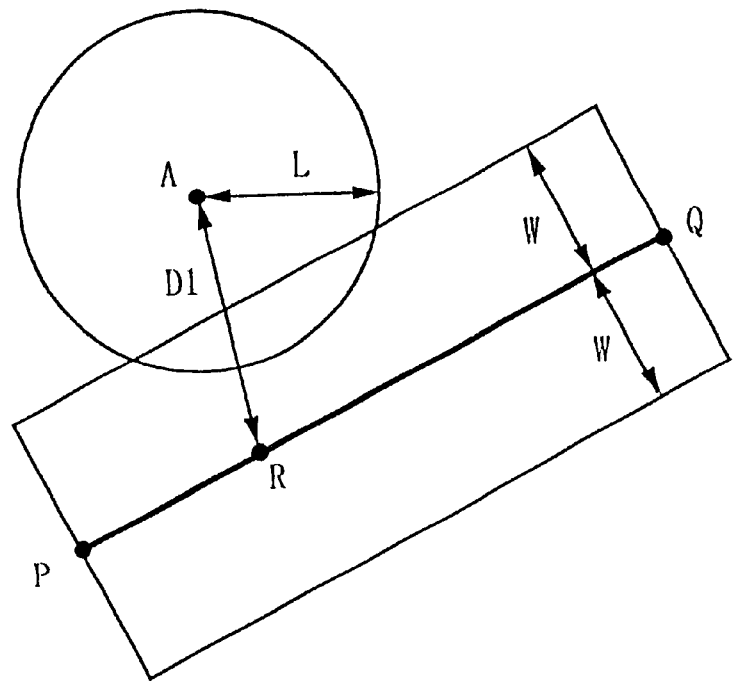
FIGS. 5a and 5b are diagrams in assistance of explaining the operation of the overlap determination unit 11a of the map information changing device 1 shown in FIG. 1.

The operation of the overlap calculator 22 is described below in detail. First, with reference to FIG. 5a, the procedure of finding an overlap between a landmark and a road is described. The overlap calculator 22 assumes each landmark as a circle with the radius L, and then calculates the distance D between a center point of a specific landmark and a segment PQ forming a specific road. When the center point of the landmark is $A(A_x, A_y)$, and endpoints of the segment PQ are $P(P_x, P_y)$ and $Q(Q_x, Q_y)$, a point R on the segment PQ is represented as $R=P+t(Q-P)$, where a parameter t satisfies $0 \leq t \leq 1$. Thus, each component of the vector from the point R to the point A is represented by the following equation (1).

$$A - R = A - \{P + t(Q - P)\} \quad (1)$$

$$= \begin{pmatrix} A_x \\ A_y \end{pmatrix} - \left\{ (1-t) \begin{pmatrix} P_x \\ P_y \end{pmatrix} + t \begin{pmatrix} Q_x \\ Q_y \end{pmatrix} \right\}$$

$$= \begin{pmatrix} A_x + (t-1)P_x - tQ_x \\ A_y + (t-1)P_y - tQ_y \end{pmatrix}$$

Therefore, the distance D between the landmark and the road is a minimum value of the distance between the points A and R, that is, a minimum value of a distance D1 defined in the following equation (2), $$D1 = \sqrt{\text{e,rad}}\, \{A_x+(t-1)P_x-tQ_x\}^2+\{A_y+\{A_y+(t-1)P_y-tQ_y\}^2+\text{ee}} \quad (2)$$

where $0 \leq t \leq 1$.

The distance D can be found by differentiating a square of the distance D1 defined by the above equation (2), or by calculating a distance between a point and a line or between two points, based on the knowledge of a geometrical characteristic of two-dimensional graphics.

By referring to the road width W calculated by the road width calculator 20, the size L of the landmark calculated by the size calculator 21, and the distance D calculated in the above manner, the overlap calculator 22 determines as "overlap" if $D < L+W$, and "not overlap" if $D \geq L+W$.

Figure 5B:
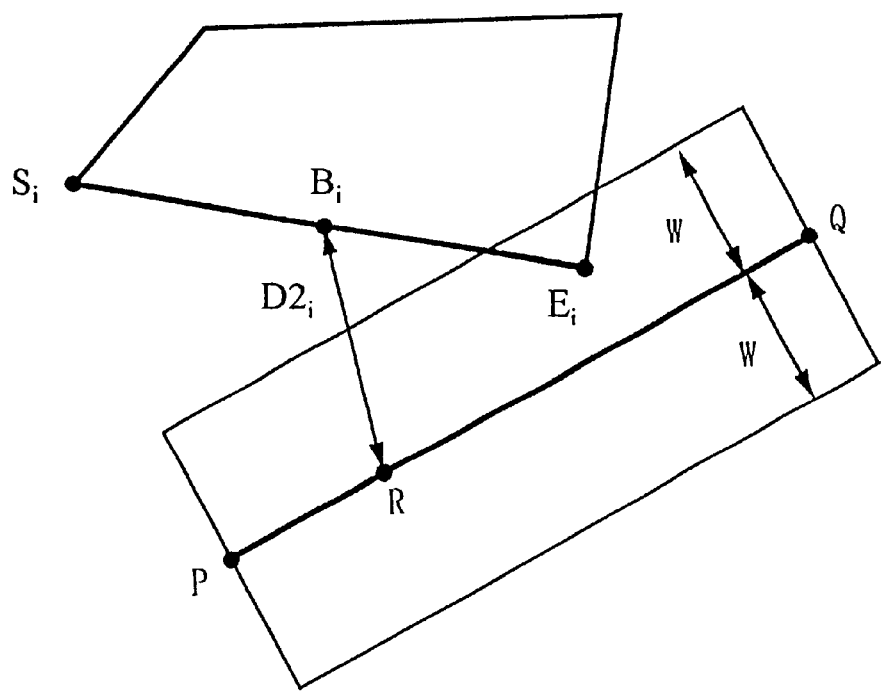

Next, with reference to FIG. 5b, the procedure of determining an overlap between an area and a road is described. Each area is defined as a polygon having n segments $L_1$, $L_2$, ..., $L_n$ as its sides. The overlap calculator 22 first calculates a distance $D_i$ between each segment $L_i$ and the segment PQ composing the road. When endpoints of the i-th segment $L_i$ are $S_i(S_{ix}, S_{iy})$ and $E_i (E_{ix}, E_{iy})$, a point B on the segment $L_i$ is represented as $B_i=S_i+u_i(E_i-S_i)$, where a parameter $u_i$ satisfies $0 \leq u_i \leq 1$. Also, the point R on the segment PQ is represented as $R=P+t(Q-P)$, where the parameter t satisfies $0 \leq t \leq 1$. Thus, each component of the vector from the point R to the point $B_i$ is represented by the following equation (3).

$$B_i - R = \{S_i + u_i(E_i - S_i)\} - \{P + t(Q - P)\} \quad (3)$$

$$= \left\{ (1-u_i) \begin{pmatrix} S_{ix} \\ S_{iy} \end{pmatrix} + u_i \begin{pmatrix} E_{ix} \\ E_{iy} \end{pmatrix} \right\} - \left\{ (1-t) \begin{pmatrix} P_x \\ P_y \end{pmatrix} + t \begin{pmatrix} Q_x \\ Q_y \end{pmatrix} \right\}$$

$$= \begin{pmatrix} (1-u_i)S_{ix} + u_i E_{ix} + (t-1)P_x - tQ_x \\ (1-u_i)S_{iy} + u_i E_{iy} + (t-1)P_y - tQ_y \end{pmatrix}$$

Therefore, the distance $D_i$ between the segment $L_i$ and the road is a minimum value of the distance between the points $B_i$ and R, that is, a minimum value of a distance $D2_i$ defined in the following equation (4), $$D2_i = \sqrt{D_{ix}^2 + D_{iy}^2} \quad (4)$$

WHERE, $$D_{ix}=(1-u_i)S_{ix}+u_i E_{ix}+(t-1)P_x-tQ_x$$

$$D_{iy}=(1-u_i)S_{iy}+u_i E_{iy}+(t-1)P_y-tQ_y$$

where $0 \leq u_i \leq 1$ and $0 \leq t \leq 1$.

The distance $D_i$ can be found by carrying out partial differentiation on the square of the distance $D2_i$ defined by the above equation (4) with respect to the parameters $u_i$ and t. Based on the knowledge of a geometrical characteristic of two-dimensional graphics, the distance $D_i$ can also be found by determining whether two segments cross each other or not, and then calculating a distance between a point and a line or between two points.

The overlap calculator 22 calculates the distance $D_i$ between every segment $L_1$ and the road, and then finds a minimum value M of the calculated distance $D_i$. The overlap calculator 22 compares the road width W calculated by the road width calculator 20 with the minimum value M of the distance $D_i$, and determines as "overlap" if $M<W$, and "not overlap" if $M \geq W$.

Next, the operation of the position changer 12a is described. The position changer 12a changes the position of the object determined as "overlap" by the overlap determination unit 11a so as to resolve the overlap between the object and the road. This change is carried out based on the position change information 33 composed of the positional information of that road and the object information 31. Described below is how to resolve an overlap.

Figure 6A:
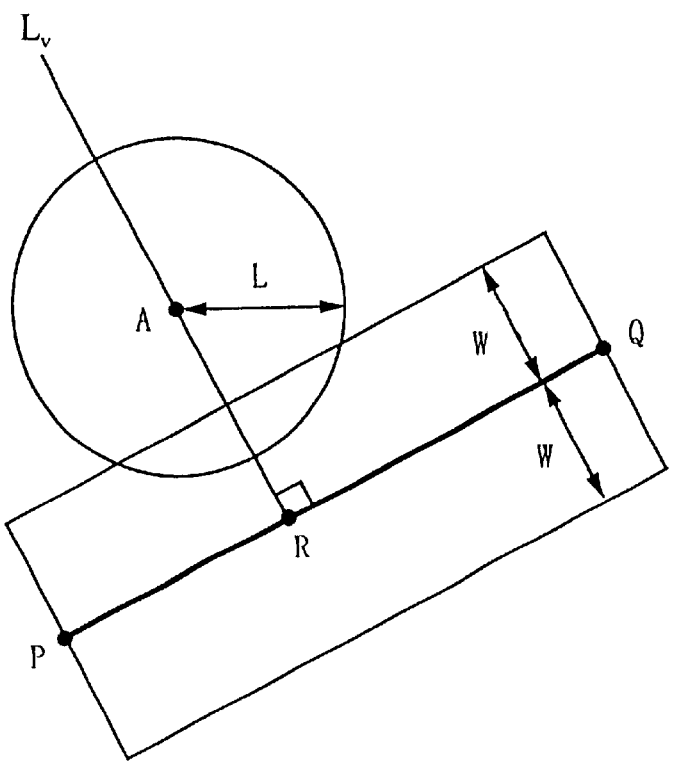
FIGS. 6a and 6b are diagrams in assistance of explaining the operation of a position changer 12a of the map information changing device 1 shown in FIG. 1 for changing a landmark position.
Figure 6B:
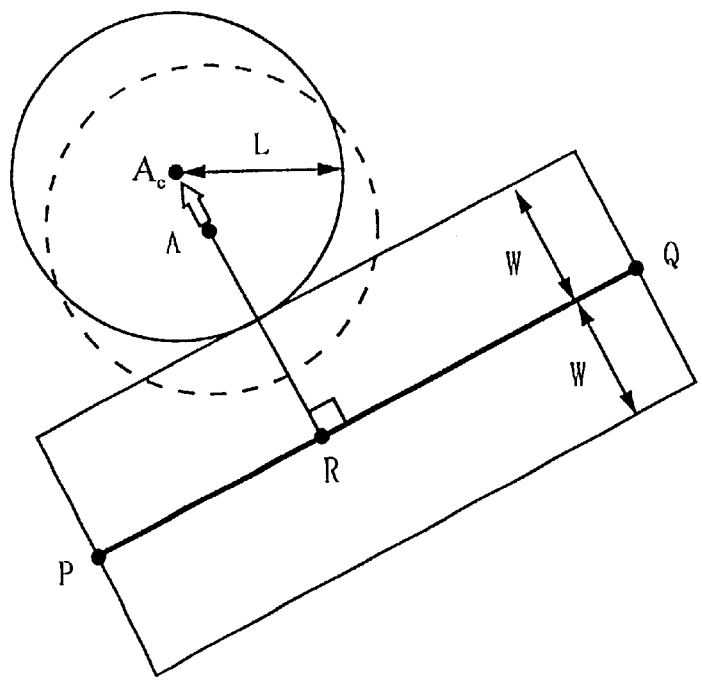

First, with reference to FIGS. 6a and 6b, the procedure of resolving an overlap between a landmark and a road is described. As shown in FIG. 6a, a point R is a foot of a perpendicular dropped from the center point A of a specific landmark to a line that connects the points P and Q, and $L_v$ is a ray extending from the point R through the point A. The position changer 12a arbitrarily selects a point $A_c$ on the ray $L_v$ so that a distance from the point R is not less than (L+W), and changes the center point A of the landmark to the point $A_c$. FIG. 6b is a diagram showing a state in which the position changer 12 selects a point so that the distance from the point R becomes (L+W). As such, the landmark can be changed in position so as not to overlap with the road, while keeping its location side with respect to the center line of the road.

Next, with respect to FIGS. 7a, 7b, and 8 through 10, the procedure for resolving an overlap between an area and a road is described. The position changer 12a changes positional information of vertices of a specific area through the following three steps. Note that, in the following description on the three steps, a road defined by the segment PQ is to be processed, a line going through the two points P and Q is represented as $L_{PQ}$, and each vertex of the area is as $S_i$.

Figure 7A:
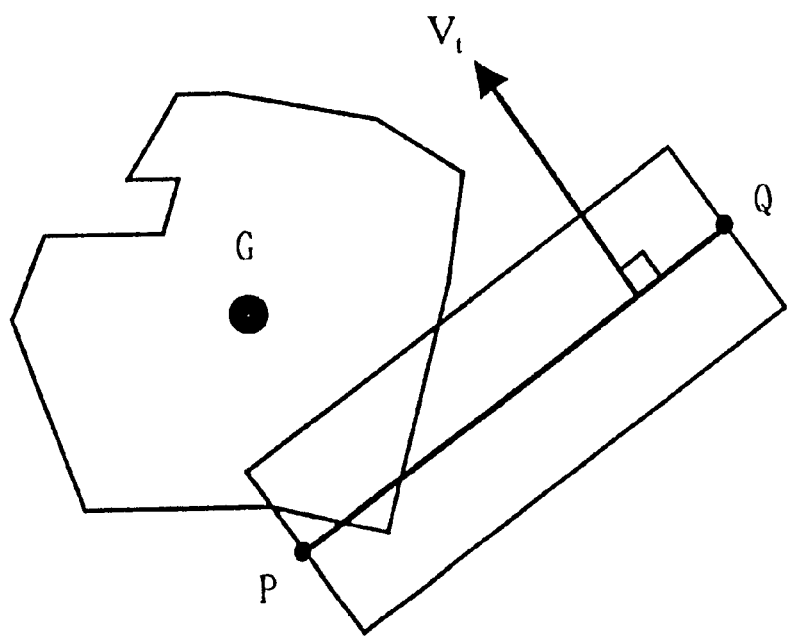
FIGS. 7a and 7b are diagrams showing how to calculate a deforming direction by the position changer 12a of the map information changing device 1 shown in FIG. 1.
Figure 7B:
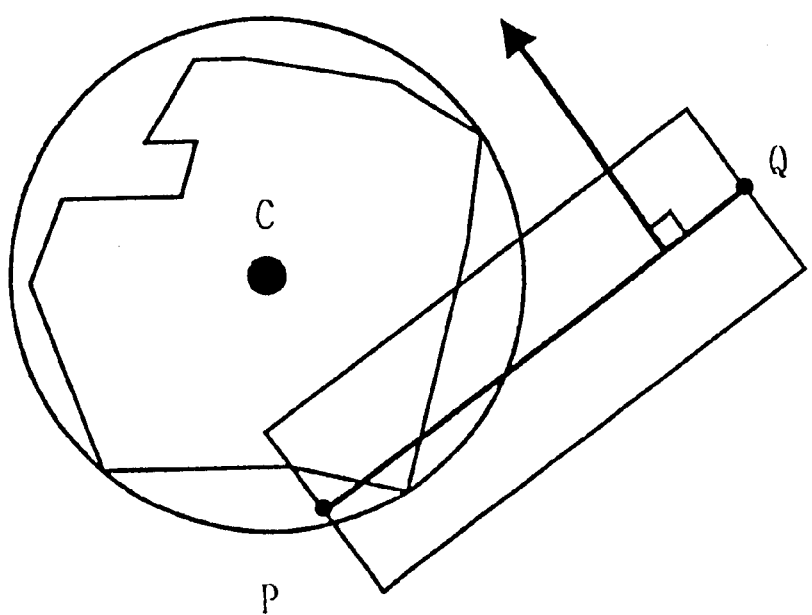

In the first step, a direction $V_t$ in which the area should be deformed (hereinafter referred to as deforming direction) is calculated (refer to FIGS. 7a and 7b) The deforming direction $V_t$ is either one of two direction perpendicular to the line $L_{PQ}$. The position changer 12a calculates a barycenter G of the area (FIG. 7a), or a center C of a circle circumscribed about the area (FIG. 7b). Of the two directions perpendicular to the line $L_{PQ}$, a direction from the line $L_{PQ}$ toward the barycenter G or the center C is taken as the deforming direction $V_t$.

Figure 8:
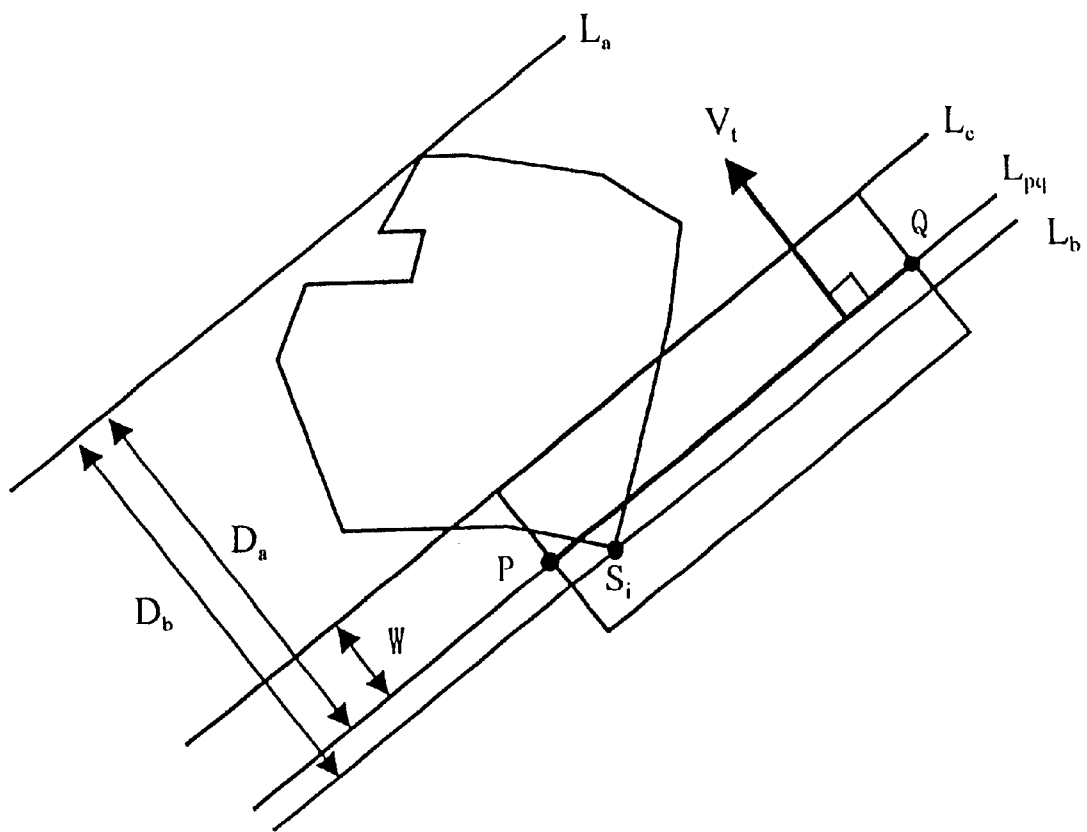
FIG. 8 is a diagram in assistance of explaining a distance between a road and a line passing through each vertices of an area in the position changer 12a of the map information changing device 1 shown in FIG. 1.

In the second step, a deforming coefficient K for use in deforming the area is calculated (refer to FIG. 8). Here, consider a set of lines going through each vertex $S_i$ and parallel to the line $L_{PQ}$. Of this set of lines, a line that is located in the deforming direction $V_t$ with respect to the line $L_{PQ}$ and has a maximum distance therefrom is referred to as a line $L_a$. Also, of this set, a line that has a maximum distance from the line $L_a$ is referred to as $L_b$, and a line located in the deforming direction $V_t$ with respect to the line $L_{PQ}$ and at a distance equal to the road width W therefrom is referred to as a line $L_c$. When a distance between the line $L_{PQ}$ and the line $L_a$ is $D_a$ and a distance between the line $L_a$ and the line $L_b$ is $D_b$, the deforming coefficient K is calculated, based on the above distances and the road width W, as $K=(D_a-W)/D_b$. The calculated deforming coefficient K satisfies $0 \leq K \leq 1$.

Figure 9:
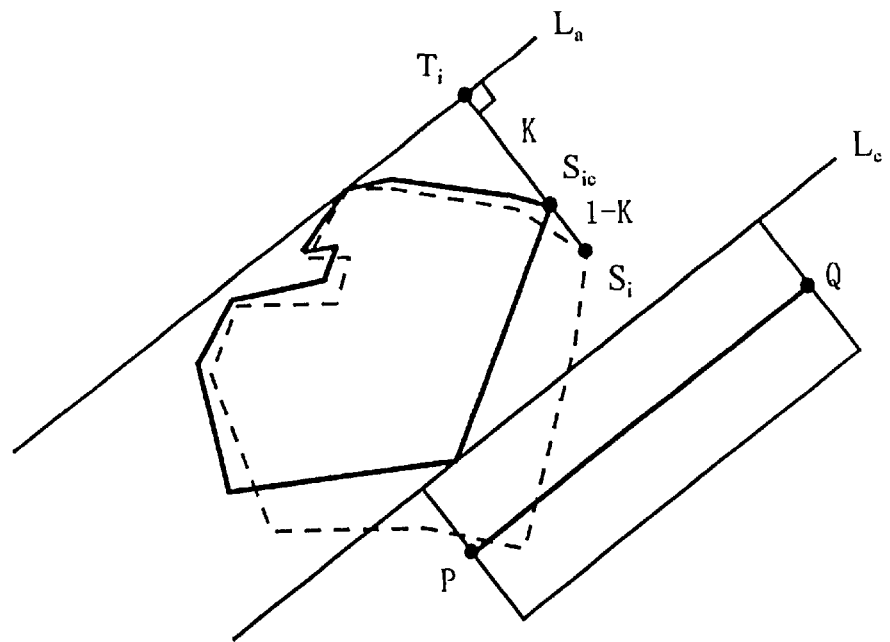
FIG. 9 is a diagram in assistance of explaining an area position changing operation by deformation in the position changer 12a of the map information changing device 1 shown in FIG. 1.

In the third step, the position of each vertex $S_1$ is changed in the deforming direction $V_t$ so that the distance to the line $L_a$ becomes K-fold (refer to FIG. 9). That is, when a foot of a perpendicular dropped from the point $S_i$ to the line $L_a$ is $T_i$, each vertex $S_i$ is changed to a point $S_i$ internally dividing a segment $T_iS_i$ in the ratio of K:(1-K). With this change, the area originally located between the two lines $L_a$ and $L_b$ is deformed by a factor of K in the deforming direction $V_t$, and located between the two lines $L_a$ and $L_c$.

Through the first to third steps, the area is deformed by a factor of K ($0=K \leq 1$) in the direction perpendicular to the line $L_{PQ}$ and away therefrom. As such, the positions of all vertices of the area are changed so that they lie on the opposite side of the line $L_{PQ}$ with reference to the line $L_c$. Thus, the area no longer overlaps with the road on width display. Thus, through the first to third steps, the area can be changed in position so as not to overlap with the road, while keeping its location side with respect to the center line of the road.

Figure 10:
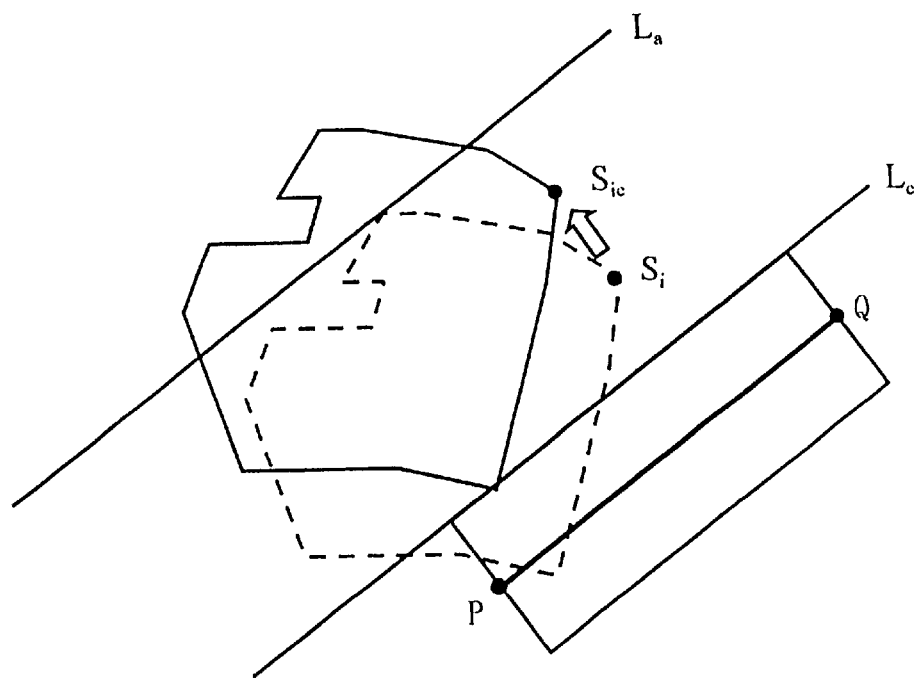
FIG. 10 is a diagram in assistance of explaining an area position changing operation by parallel translation in the position changer 12a of the map information changing device 1 shown in FIG. 1.

Alternatively, similarly to the case of the landmark change, the position changer 12a may move every vertex $S_i$ of the area along the deforming direction $V_t$ by an arbitrary distance not less than $(D_b-D_a+W)$. This movement is shown in FIG. 10. Also with this, the positions of all vertices of the area are changed so that they lie on the opposite side of the line $L_{PQ}$ with reference to the line $L_c$. Therefore, the area can be changed in position so as not to overlap with the road, while keeping its location side with respect to the center line of the road. Moreover, the position changer 12a may change the area in position by combining the above-described two techniques, vertex-moving and area-deforming techniques, together.

As stated above, according to the present embodiment, whether a specific object and a specific road both included in the map information overlap each other or not when they are on width display is first determined. Then, the overlapping object is changed in position so as not to overlap with the road, while keeping its location side with respect to the center line of the road. Therefore, when the map information generated by the map information changing device according to the present embodiment is displayed with road width, every object is displayed so as not to overlap with any road, and a realistic screen is presented to the users.

The changed map information storage 13 according to the present embodiment stores the entire map information for width display. Alternatively, the changed map information storage 13 may store only the object information 34 received from the position changer 12a. Such partial map information is used simultaneously with the existing map information for zero-width display.

(Second Embodiment)

Figure 11:
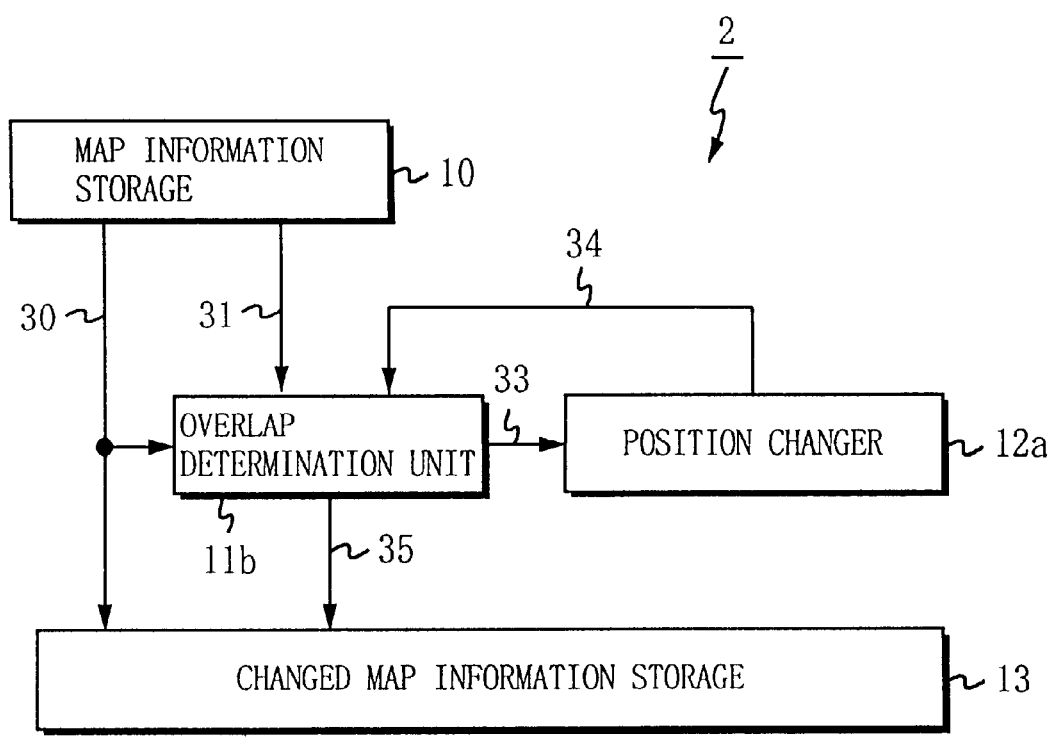
FIG. 11 is a block diagram showing the structure of a map information changing device according to a second embodiment of the present invention.

FIG. 11 is a block diagram showing the structure of a map information changing device 2 according to a second embodiment of the present invention. This map information changing device 2 automatically converts the map information for zero-width display into the one for width display, as in the first embodiment. The map information changing device 2 includes the map information storage 10, an overlap determination unit 11b, the position changer 12a, and the changed map information storage 13 The components identical in structure to those in the first embodiment are provided with the same reference numerals, and not described herein.

Figure 12:
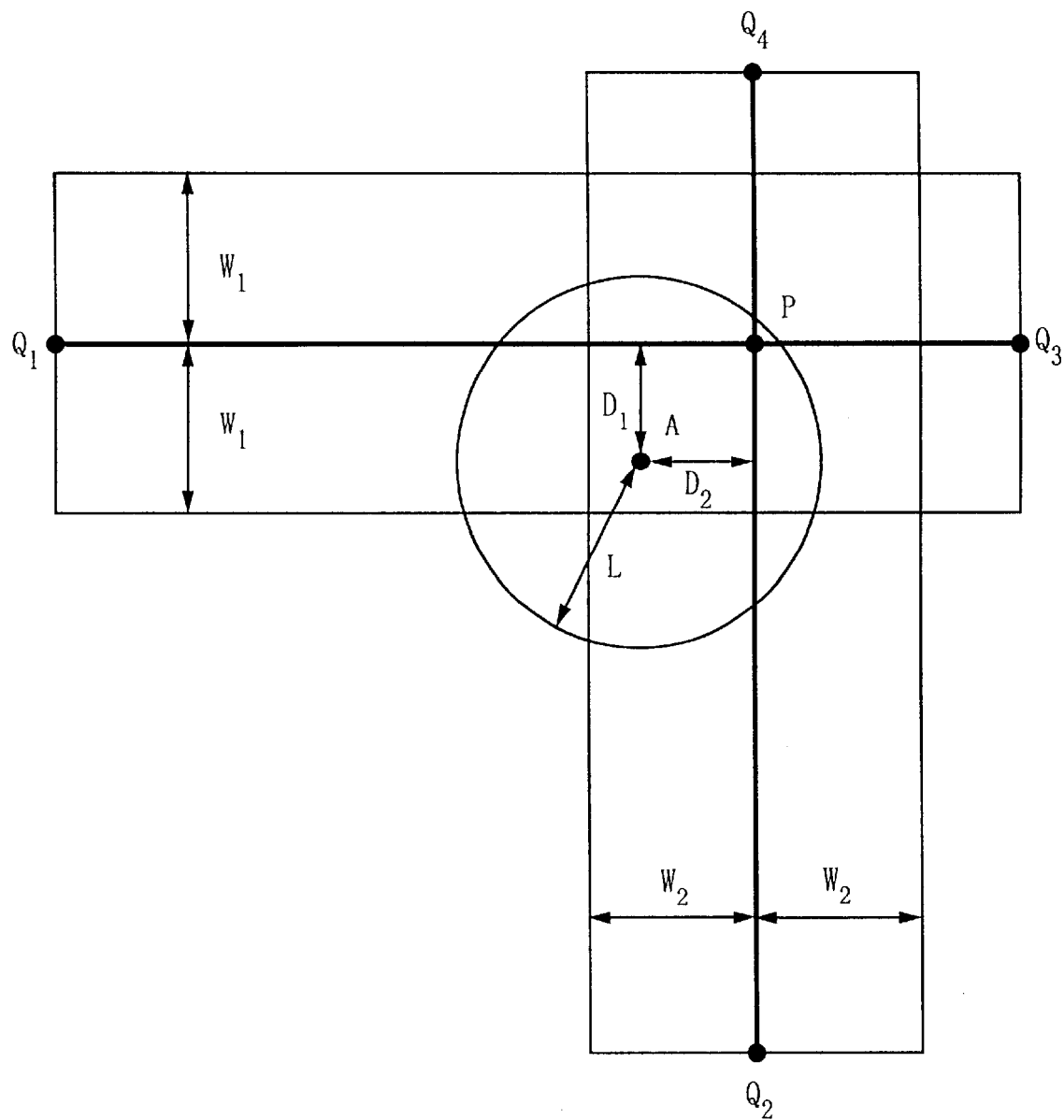
FIG. 12 is a diagram showing how a landmark overlaps with two roads.

In the map information, an object may overlap with a plurality of roads on width display, as shown in FIG. 12. In FIG. 12, a landmark is represented as a circle with a radius L centering at a point A, and an i-th (i is an integer where $1 \leq i \leq 4$) road is as a rectangle composed by providing a segment PQ, with a road width $W_i$. When a distance between the i-th road and the point A is a distance $D_i$, if $D_1 \leq L+W_1$ and $D_2 \leq L+W_2$, the landmark overlaps with two roads, first and second. Such object overlapping with a plurality of roads can be often observed in the vicinity of an intersection of roads.

In the first embodiment, it is assumed that an object possibly overlaps with a single road, at most. Therefore, the positional information of the object is changed only once, at most. On the other hand, in the present embodiment, it is assumed that an object possibly overlaps with a plurality of roads. Therefore, the positional information of the object may be changed repeatedly.

Figure 13:
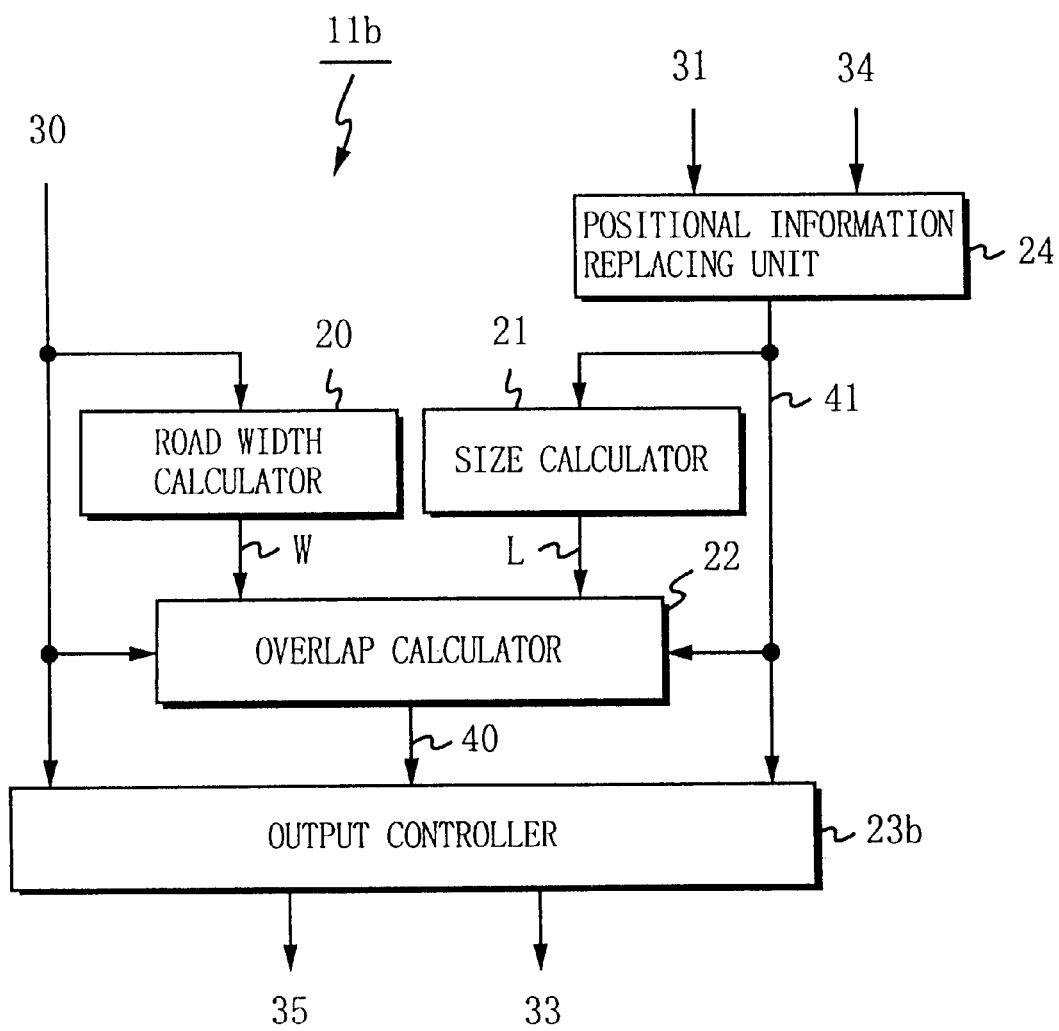
FIG. 13 is a block diagram showing the structure of an overlap determination unit 11b of a map information changing device 2 shown in FIG. 11.

FIG. 13 is a block diagram showing the structure of the overlap determination unit 11b in more detail. As shown in FIG. 13, the overlap determination unit 11b includes the road width calculator 20, the size calculator 21, the overlap calculator 22, an output controller 23b, and a positional information replacing unit 24. Of these components, the road width calculator 20, the size calculator 21, and the overlap calculator 22 operate similarly to those in the first embodiment.

The positional information replacing unit 24 replaces the positional information included in the object information 31 with the positional information included in the changed object information 34, and then outputs positional information after replacement 41. At an initial state, however, the changed object information 34 is not yet provided, and therefore the positional information replacing unit 24 outputs the object information 31 as it is as the object information after replacement 41.

The output controller 23b is provided with the road network information 30, the object information 41, and the determination signal 40. Based on the determination signal 40, the output controller 23b selectively produces outputs as follows. That is, if the determination signal 40 indicates the object and the road overlap each other, the output controller 23b outputs the position change information 33 including the positional information of the overlapping road and the object information after replacement 41. If the determination signal 40 indicates that the object does not overlap with any roads after changed in position repeatedly, the output controller 23b outputs the object information 41 after replacement as object information 35.

Figure 14:
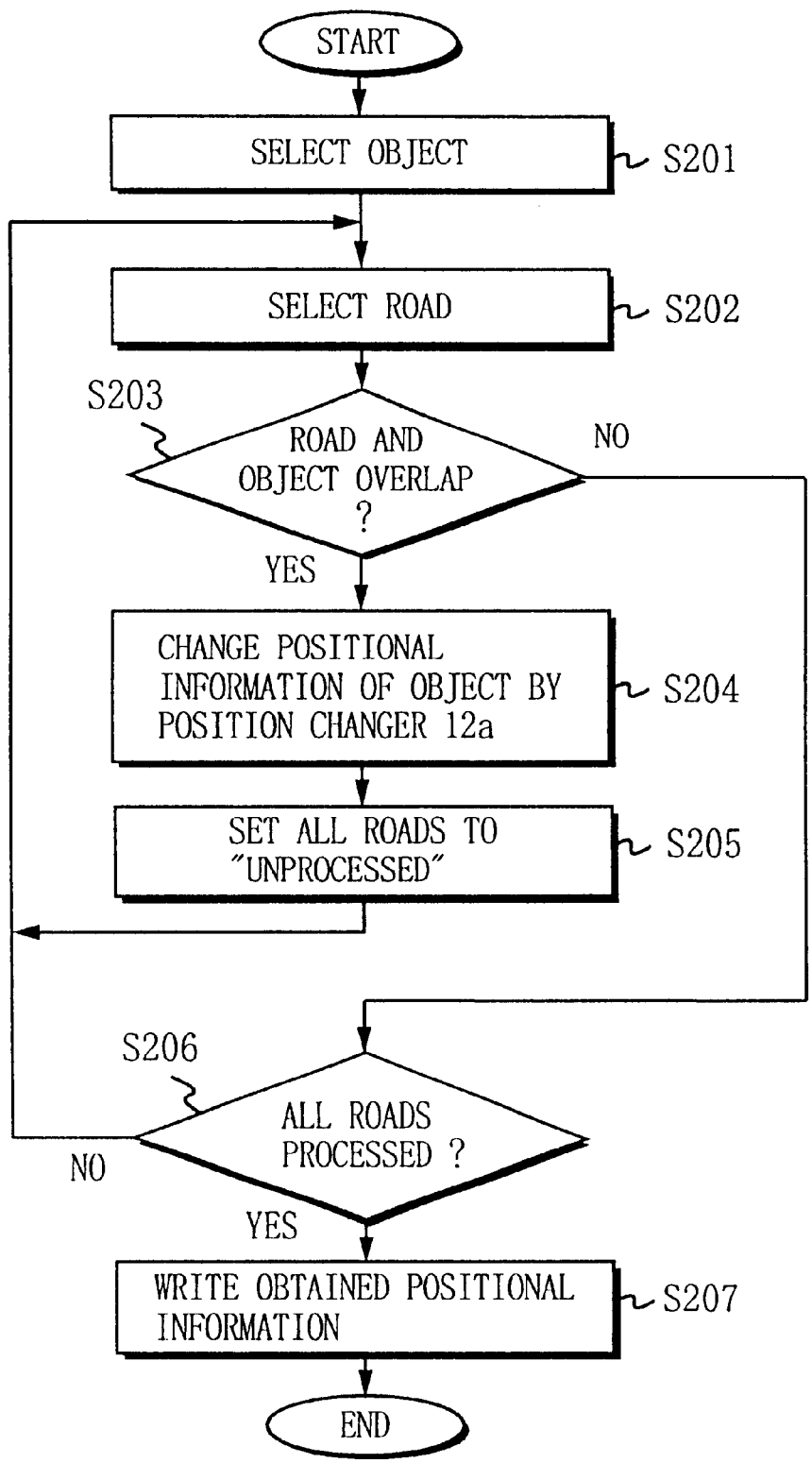
FIG. 14 is a flow chart showing the operation of the map information changing device 2 shown in FIG. 11.

The map information changing device 2 repeatedly changes the object in position until the object does not overlap with any roads on width display. With reference to a flow chart shown in FIG. 14, the operation of the map information changing device (hereinafter simply referred to as "device") 2 on a single object is now described. First, the device 2 selects an object and a road to be processed, as in the first embodiment (steps S201 and S202). Then, the device 2 determines by using the overlap determination unit 11b whether the selected object and road overlap each other or not (step S203). If they overlap each other, the procedure goes to step S204, and goes to step S206 if otherwise.

If it is determined in step S203 that they overlap each other, the device 2 calculates, by the position changer 12a, the changed object information 34 (step S204). The changed object information 34 is used for overlap determination in step S203 and thereafter. Then, the device 2 sets all roads to be "unprocessed" (step S205). The procedure then returns to step S202. Thus, overlap determination in step S203 is repeatedly carried out on every road.

If determining in step S203 that the object and the road do not overlap each other, the device 2 determines whether all roads have been processed (step S206). If any road has been unprocessed, the procedure returns to step S202. If all roads have been processed, it is determined that the selected object does not overlap with any roads. Therefore, the device 2 writes the object information 41 after replacement in the changed map information storage 13 (step S207). The process on the selected object is now completed.

Figure 15:
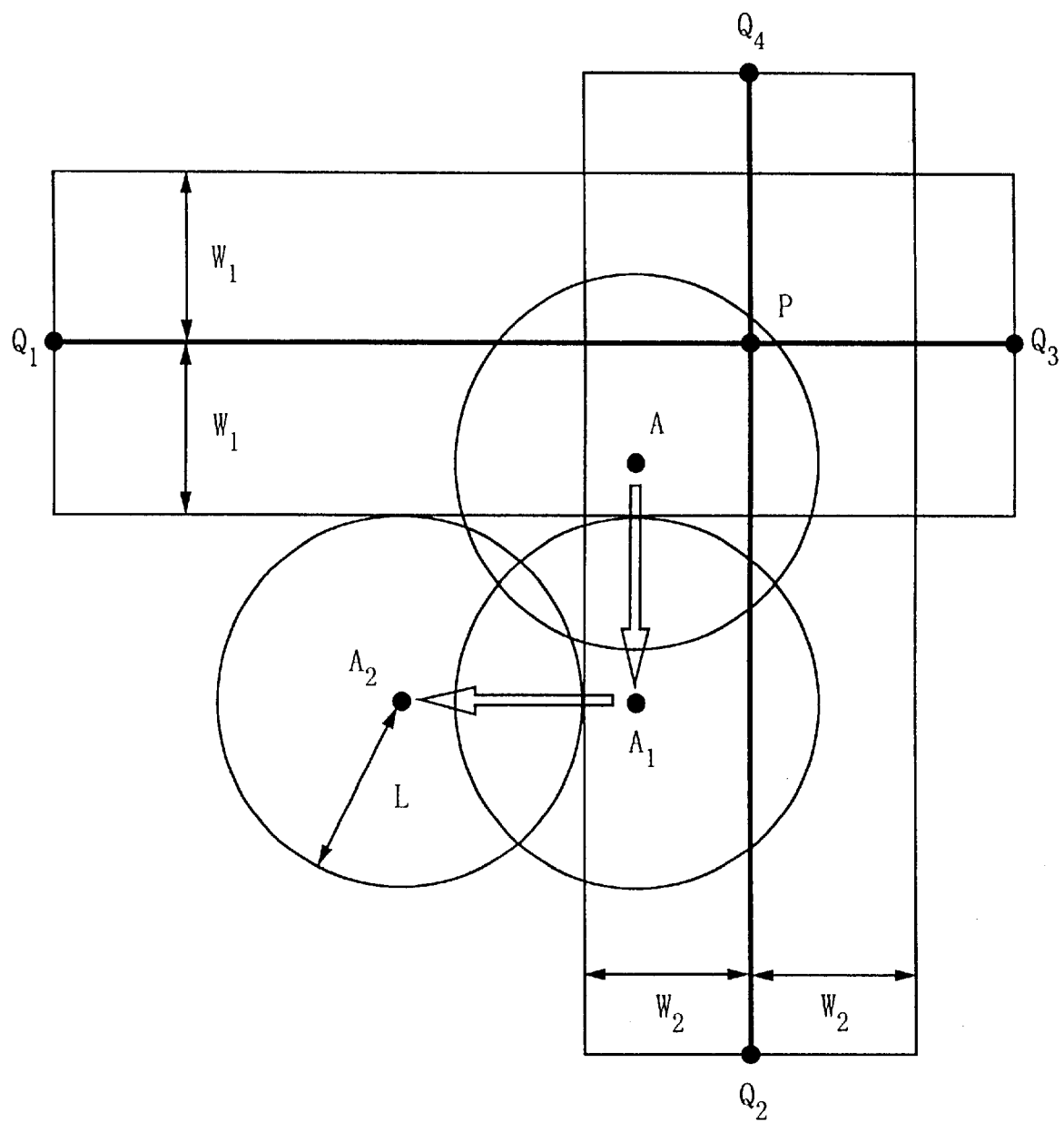
FIG. 15 is a diagram showing how the position of the landmark is gradually changed by the map information changing device 2 shown in FIG. 11.

FIG. 15 is a diagram showing how the landmark shown in FIG. 12 is gradually changed in position by the device 2. When an initial position of the landmark is a point A, the device 2 changes the landmark in position so that the landmark does not overlap with the first road defined by the segment $PQ_1$, and then with the second road defined by a segment $PQ_2$. Such changing process is now described below.

The device 2 detects, by the overlap determination 11b, whether there is a road overlapping with the landmark. Here, the device 2 detects that the first road overlaps with the landmark, and then changes the landmark in position so that the landmark does not overlap with the first road. That is, the position changer 12a of the device 2 moves the landmark to a point $A_1$ shown in FIG. 15.

Then, the device 2 detects whether there is another road overlapping with the landmark by using the object information 34 indicating that the landmark position has changed to the point $A_1$. Here, the device 2 detects that the second road overlaps with the landmark, and then changes the landmark in position so that the landmark does not overlap with the second road. That is, the position changer 12a of the device 2 moves the landmark to a point $A_2$ shown in FIG. 15.

Then, the device 2 detects whether there is still another road overlapping with the landmark. Here, none of the roads overlaps with the landmark. Therefore, the device 2 writes, in the changed map information storage 13, the object information 34 indicating that the landmark position has changed to the point $A_2$.

As such, the device 2 uses the positional information replacing unit 24 to replace the positional information included in the object information with the changed one, thereby repeatedly changing the landmark in position. Thus, any overlapping road can be sequentially detected, and the landmark can be gradually changed in position so as not to overlap with the roads.

Furthermore, the position changer 12a can change the position of an area with respect to a single road by deforming or moving the area. Therefore, the device 2 repeatedly changes the position of the area overlapping with a plurality of roads so that the area gradually moves away from the road.

As state above, according to the present embodiment, the object is changed in position so as not to overlap with a single road on width display. If the object still overlaps with another road on width display, the object is further changed in position so as not to overlap that road. As such, the object is changed in position repeatedly, and finally to a position so as not to overlap with any roads. Therefore, when the map information generated by the map information changing device according to the present embodiment is on width display, every object is displayed so as not to overlap with any road, and a realistic screen is presented to users.

Furthermore, according to the present embodiment, an object overlapping with a plurality of roads can be changed in position. Also, a potential overlap can be resolved. Here, the potential overlap is an overlap that may newly occur, due to a change made for resolving an overlap between an object and one road, between that object and another road. In the first embodiment, the position of the object is changed once at most, and therefore the generated map information for width display may possibly include the above-stated potential overlaps. On the other hand, in the present embodiment, the position of the object is changed repeatedly, and therefore the generated map information for width display does not include potential overlaps.

Depending on the characteristics of the map information for zero-width display, there exist some possibilities that not all overlaps can be resolved even by repeatedly changing each object in position. In consideration of such possibilities, the number of times for changing the position may be limited. In this case, if the object cannot be changed in position so as not to overlap with any roads even after a predetermined number of changes, the device 2 writes, in the changed map information storage 13, the positional information at this moment or originally provided.

(Third Embodiment)

Figure 16:
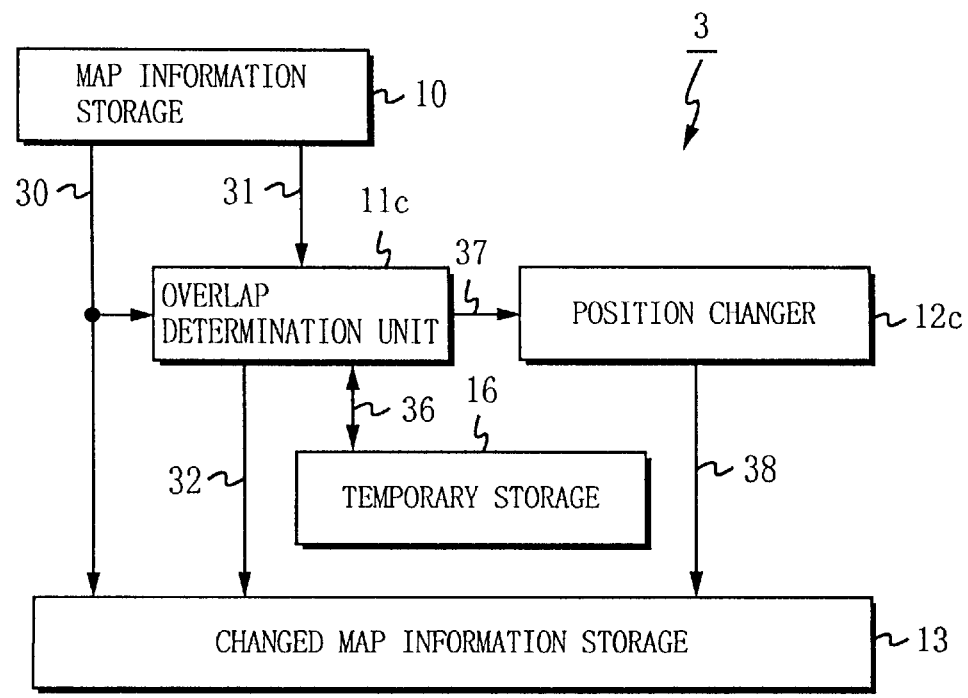
FIG. 16 is a block diagram showing the structure of a map information changing device according to a third embodiment of the present invention.

FIG. 16 is a block diagram showing the structure of a map information changing device 3 according to a third embodiment of the present invention. This map information changing device 3 automatically converts the map information for zero-width display into the one for width display, as in the first embodiment. The map information changing device 3 includes the map information storage 10, an overlap determination unit 11c, a position changer 12c, the changed map information storage 13, and a temporary storage 16. The components identical in structure to those in the first embodiment are provided with the same reference numerals, and not described herein.

In the present embodiment, similarly to the second embodiment, a case where an object overlaps with a plurality of roads is considered. In the second embodiment, every time an overlapping road is detected, the object is changed in position so as not to overlap with that road. On the other hand, in the present embodiment, every time an overlapping road is detected, its positional information is temporarily stored. Then, the object is changed in position in one process so as not to overlap with all of the detected roads.

The temporary storage 16 stores the positional information of the road determined by the overlap determination unit 11c as overlapping with the object. In consideration of all roads determined by the overlap determination unit 11c as overlapping with the object, the position changer 12c changes the object in position in one process so that the object does not overlap with any of these roads. The operation of the position changer 12c will be described later in detail.

Figure 17:
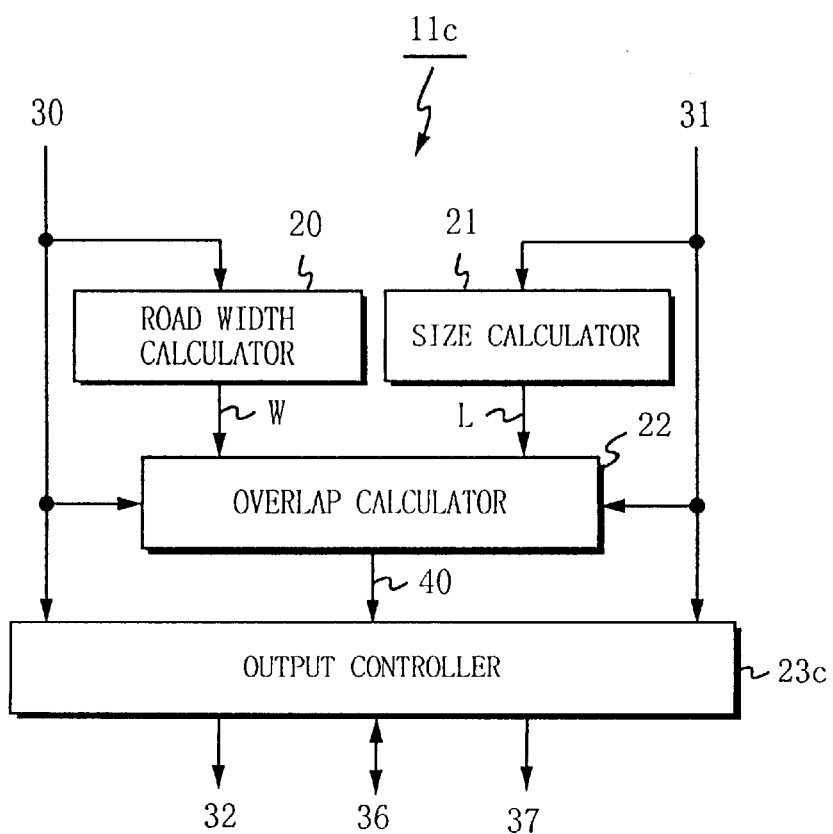
FIG. 17 is a block diagram showing the structure of an overlap determination unit 11c of a map information changing device 3 shown in FIG. 16.

FIG. 17 is a block diagram showing the structure of the overlap determination unit 11c in more detail. As shown in FIG. 17, the overlap determination unit 11c includes the road width calculator 20, the size calculator 21, the overlap calculator 22, and an output controller 23c. Of these components, the road width calculator 20, the size calculator 21, and the overlap calculator 22 operate similarly to those in the first embodiment.

The output controller 23c is provided with the road network information 30, the object information 31, and the determination signal 40. Based on the determination signal 40, the output controller 23c selectively produces outputs as follows. That is, if the determination signal 40 indicates the object and the road overlap each other, the output controller 23c outputs the positional information of the road determined as overlapping as road positional information 36 to be stored in the temporary storage 16. If the determination signal 40 indicates that they do not overlap each other, the output controller 23c ignores the positional information on that road. After overlap determination has been made over all the roads, the output controller 23c reads the road positional information 36 from the temporary storage 16. Then, the output controller 23c outputs the read road positional information 36 and the object information 31 as position change information 37. If no road positional information 36 is stored in the temporary storage 16 at all, the output controller 23c outputs the object information 31 as it is as the object information 32 to be stored.

Figure 18:
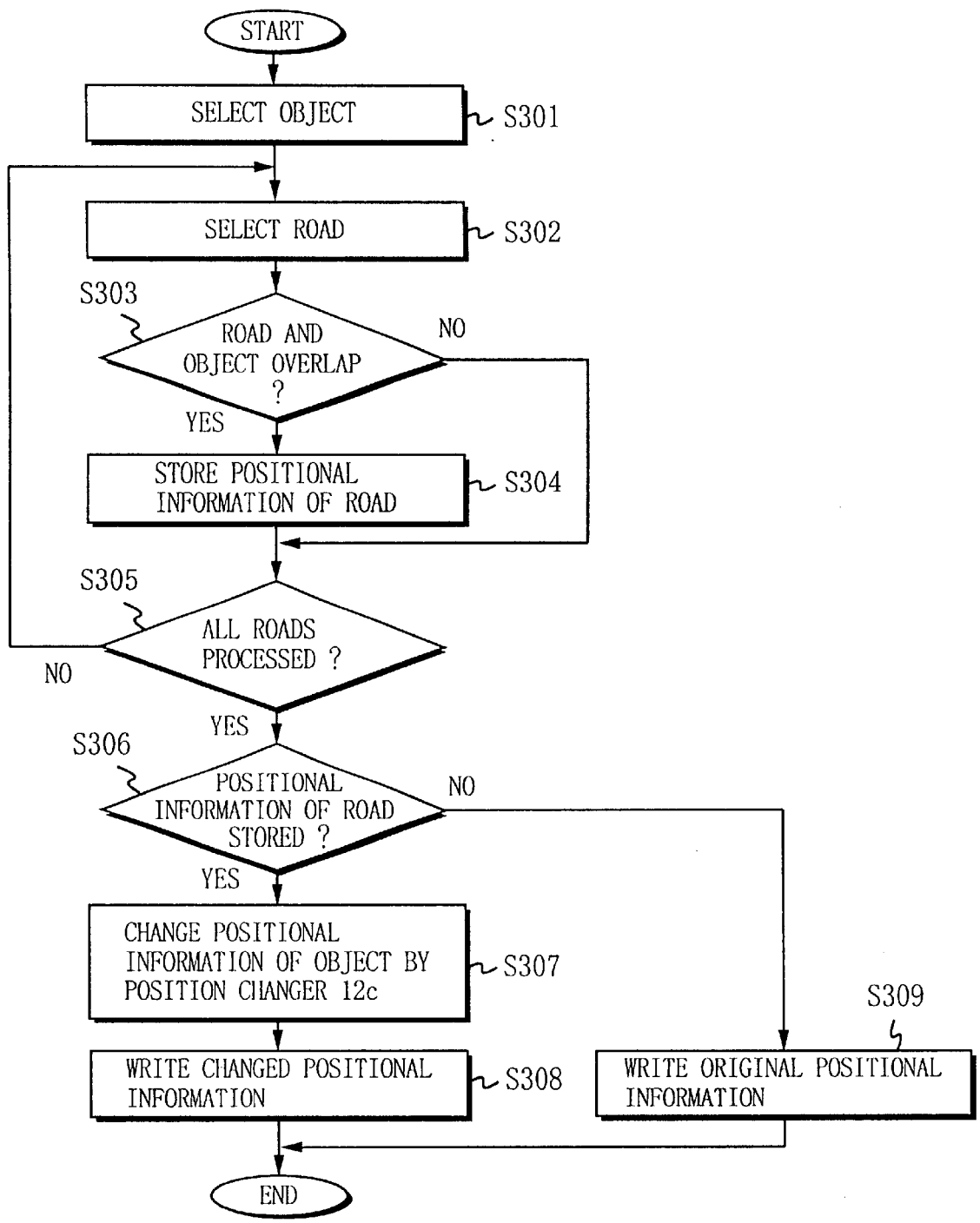
FIG. 18 is a flow chart showing the operation of the map information changing device 3 shown in FIG. 16.

The map information changing device 3 sequentially detects a road overlapping with a specific object, temporarily stores the positional information thereof, and changes the object in position in one process so that the object does not overlap with any of the stored roads. With reference to FIG. 18, described is the operation of the map information changing device (hereinafter simply referred to as "device") 3 on a single object. First, the device 3 selects an object and a road to be processed, as in the first embodiment (steps S301 and S302). Then, the device 3 determines by the overlap determination unit 11c whether the selected object and road overlap each other or not (step S303) If they overlap each other, the device 3 stores the positional information of the selected road in the temporary storage 16 (step S304). The device 3 repeats the process from steps S302 to S304 on every road (step S305).

Then, the device 3 determines whether the positional information of the selected road is stored in the temporary storage 16 (step S306). If determining in step S306 that such positional information is stored, the device 3 calculates, by using the position changer 12c, changed object information 38 (step S307), and stores the changed object information 38 in the changed map information storage 13 (step S308). The process on the selected object is now completed If determining in step S306 that the positional information is not stored, the device 3 writes the object information 31 as it is in the changed map information storage 13 (step S309). The process on the selected object is now completed.

Next, the operation of the position changer 12c is described. The position changer 12c changes the position of the object determined as "overlap" by the overlap determination unit 11c so as to resolve the overlaps with every road. This change is carried out based on the position change information 37 composed of the road positional information 36 and the object information 31. Described below is how to resolve overlaps between the object with a plurality of roads in one process.

Figure 19:
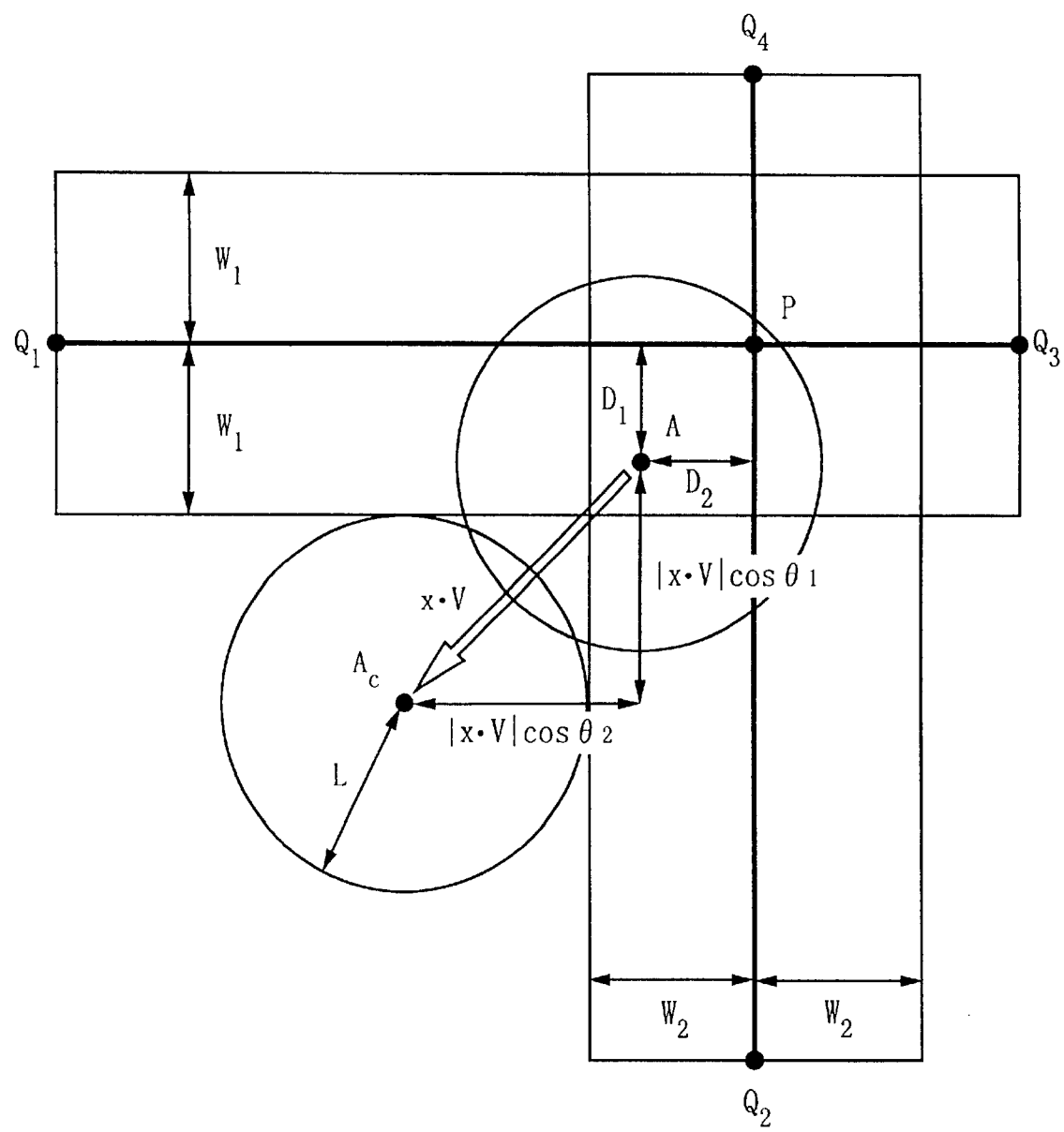
FIG. 19 is a diagram showing how the position of the landmark is changed by the map information changing device 3 shown in FIG. 16 with a plurality of roads considered at one time.

First, with reference to FIG. 19, how to resolve overlaps between a landmark and a plurality of roads in one process is described. It is assumed herein that the landmark overlaps with n roads on width display, and an i-th (i is an integer where $1 \leq i \leq n$) road is defined by a segment $P_i Q_i$. Note that FIG. 19 shows an example where n=2.

In a first step, a vector V representing a direction in which the landmark should be moved is calculated. Assuming that a point $R_i$ is a foot of a perpendicular dropped from the center point A of the landmark to a line going through the two points $P_i$ and $Q_i$, the position changer 12c calculates, for each road, a vector $V_i$ from the point $R_i$ to the point A. Then position changer 12c finds a unit vector in the direction of each vector $V_i$, and takes a sum of the found unit vectors as the vector V. In other words, the vector V is calculated by the following equations (5) and (6), $$V_i = A - R_i \tag{5}$$

$$V = \Sigma(V_i / |V_i|) \text{ (i=1 to } n) \tag{6}$$

where $|V_i|$ is the magnitude of the vector $V_i$, and $\Sigma$ represents addition of the vectors.

In a second step, the amount of movement of the landmark in the direction of the vector V is calculated for resolving overlaps with the plurality of roads. The landmark is moved to a position $A_c$ represented by $A_c = A + x$ V, where a parameter x satisfies x>0. The position changer 12c calculates an angle $\Theta$ formed by each vector $V_i$ and the vector V, and then finds the range of $x_i$ that satisfies the following equation (7) for each i.

$$|x_i V| \cos \Theta_i \geq L + W_i - D_i \tag{7}$$

If $x_i$ that satisfies the above equation (7) is selected and the landmark is moved in the direction of the vector V, an overlap between the landmark and the i-th road can be resolved. Therefore, if x that satisfies the above equation (7) is selected for every i satisfying $1 \leq i \leq n$, the amount of movement required for resolving overlaps with every road can be calculated.

As such, the direction and the amount of movement of the landmark are calculated in the first and second steps, respectively. Thus, the landmark is moved to the position $A_c$ so as not to overlap with any road.

If the angle $\Theta_i$ is not less than $\rho/2$, the left side of the above equation (7) becomes negative, while the right side thereof becomes positive. Thus, $x_i$ that satisfies the above equation (7) does not exist. Therefore, the overlap between the landmark and the i-th road can not be resolved even if the landmark is moved in the direction of the vector V. In this case, the position changer 12c may output the positional information of the landmark as it is without any change. Alternatively, the position changer 12c may execute the first and second steps after excluding any road whose angle $\Theta_i$ becomes not less than $\pi/2$. By adopting the former method, overlaps with roads cannot be resolved at all, but by adopting the latter method, some overlaps can be resolved.

Next, how to resolve overlaps between an area and roads in one process is described. The position changer 12a according to the first embodiment resolves an overlap between the area and a single road by deforming or moving the area. The position changer 12c according to the present embodiment resolves an overlap with an area and a single road by using the area-deforming or area-moving techniques stated in the first embodiment. If the area overlaps with a plurality of roads, the position changer 12c moves the area in a manner as stated below, thereby resolving such overlaps.

First, the position changer 12c calculates a deforming direction of the area with respect to each road in the manner as that shown in the first embodiment. Then, the position changer 12c adopts a processing composed of the first and second steps adopted to each landmark for changing each vertex thereof, where the calculated deforming direction is taken as the vector $V_i$ for the landmark. Here, the parameter x is selected so as to satisfy the above equation (7) with respect to every vertices of that area and every road thereof. By using the direction and amount of movement, the area is moved in a manner similar to that in the first embodiment. Thus, overlaps between the area and the plurality of roads can be resolved in one process.

The above method is equivalent to a method in which an area is taken as a landmark having a center point A, which is either a center C or a barycenter G of a circle circumscribed about an area and having a maximum value L of a distance between the center point A and each vertex of the area, and the center point of the landmark is moved so that the landmark does not overlap with the plurality of roads.

As described above, according to the present embodiment, whether the object included in the map information overlaps with a plurality of roads included in the map information on width display is first determined. If the object overlaps with the plurality of roads, the object is moved, in one process, to a position not overlapping with the plurality of roads on width display, while keeping its location side with respect to the center line of the road. Thus, when the map information generated by the map information changing device of the present embodiment is displayed with road width so that the objects do not overlap the roads, and a realistic screen can be presented to the user.

(Fourth Embodiment)

Figure 20:
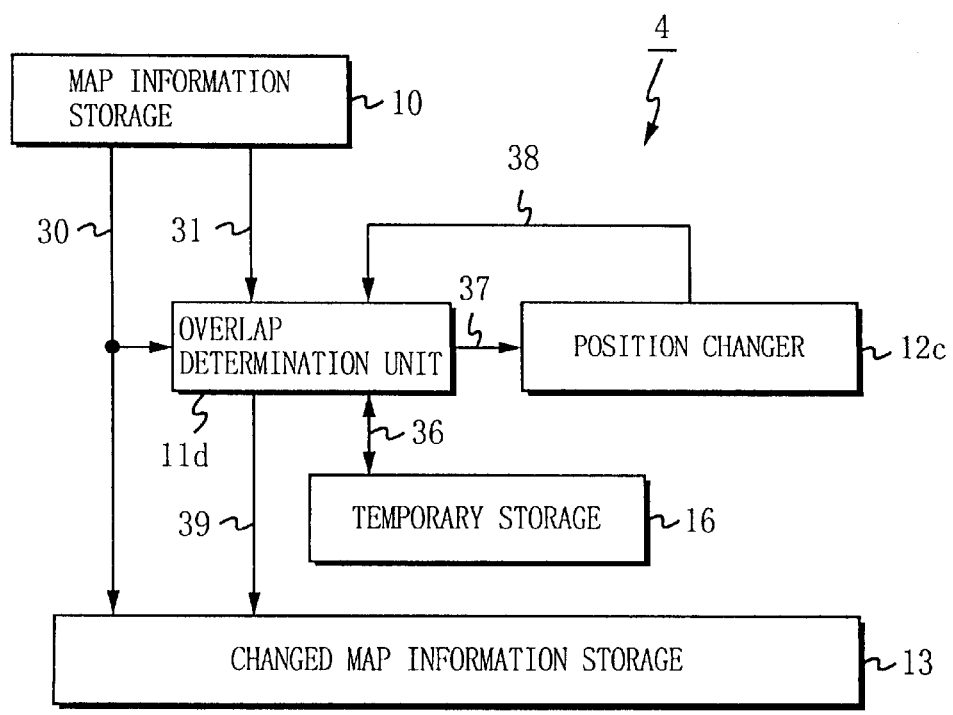
FIG. 20 is a block diagram showing the structure of a map information changing device according to a fourth embodiment of the present invention.

FIG. 20 is a block diagram showing the structure of a map information changing device 4 according to a fourth embodiment of the present invention. The map information changing device 4 automatically converts the map information for zero-width display into the one for width display, as in the first embodiment. The map information changing device 4 includes the map information storage 10, a overlap determination unit 11d, the position changer 12c, the changed map information storage 13, and the temporary storage 16. The present invention is characterized in that the object is gradually changed in position, as in the second embodiment, and that in consideration of a plurality of overlaps with roads, the object is changed in position in one process as in the third embodiment. In the present embodiment, the components identical in structure to those in the first through third embodiments are provided with the same reference numerals, and not described herein.

Figure 21:
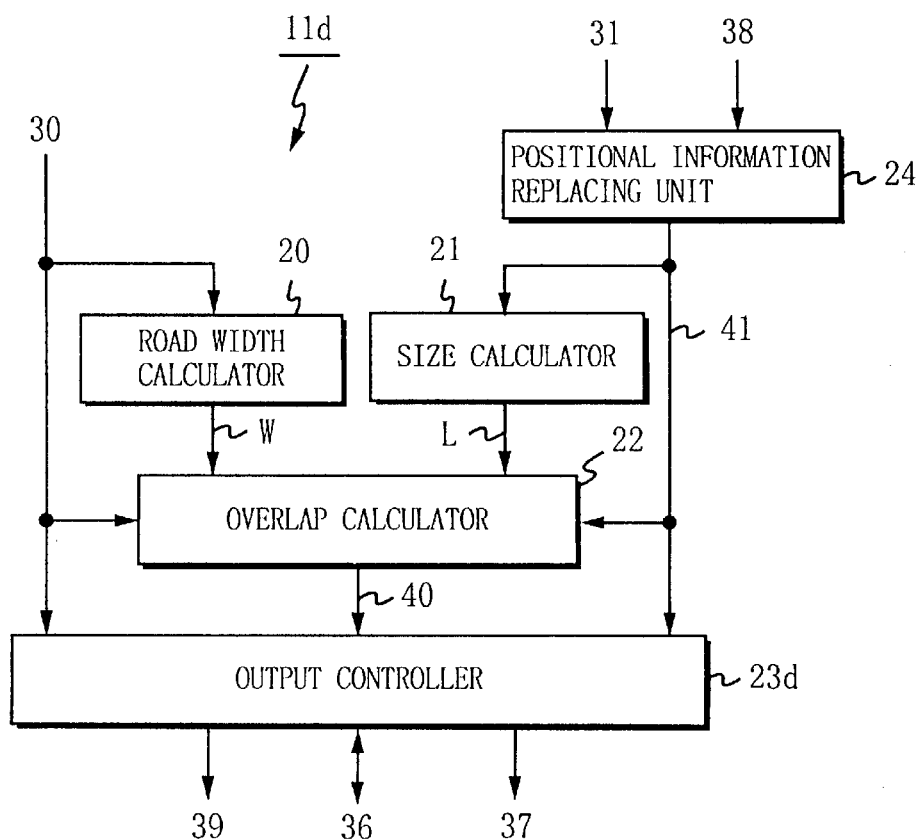
FIG. 21 is a block diagram showing the structure of an overlap determination unit 11d of a map information changing device 4 shown in FIG. 20.

FIG. 21 is a block diagram showing the structure of the overlap determination unit lid in more detail. As shown in FIG. 21, the overlap determination unit 11d includes the road width calculator 20, the size calculator 21, the overlap calculator 22, an output controller 23d, and a positional information replacing unit 24. Of these components, the road width calculator 20, the size calculator 21, the overlap calculator 22, and the positional information replacing unit 24 operate similarly to those in the first or second embodiment.

The output controller 23d is provided with the road network information 30, the object information 41, and the determination signal 40. Based on the determination signal 40, the output controller 23d selectively produces outputs as follows. That is, if the determination signal 40 indicates the object and the road overlap each other, the output controller 23d outputs the positional information of the road determined as overlapping as road positional information 36 to be stored in the temporary storage 16. If the determination signal 40 indicates that they do not overlap each other, the output controller 23d ignores the positional information of that road. After overlap determination has been made over all the roads, the output controller 23d reads the road positional information 36 from the temporary storage 16. Then, the output controller 23d outputs the read road positional information 36 and the object information 41 after replacement as position change information 37. If no road positional information 36 is stored in the temporary storage 16 at all, the output controller 23d outputs the object information 41 after replacement as it is as object information 39 to be stored.

Figure 22:
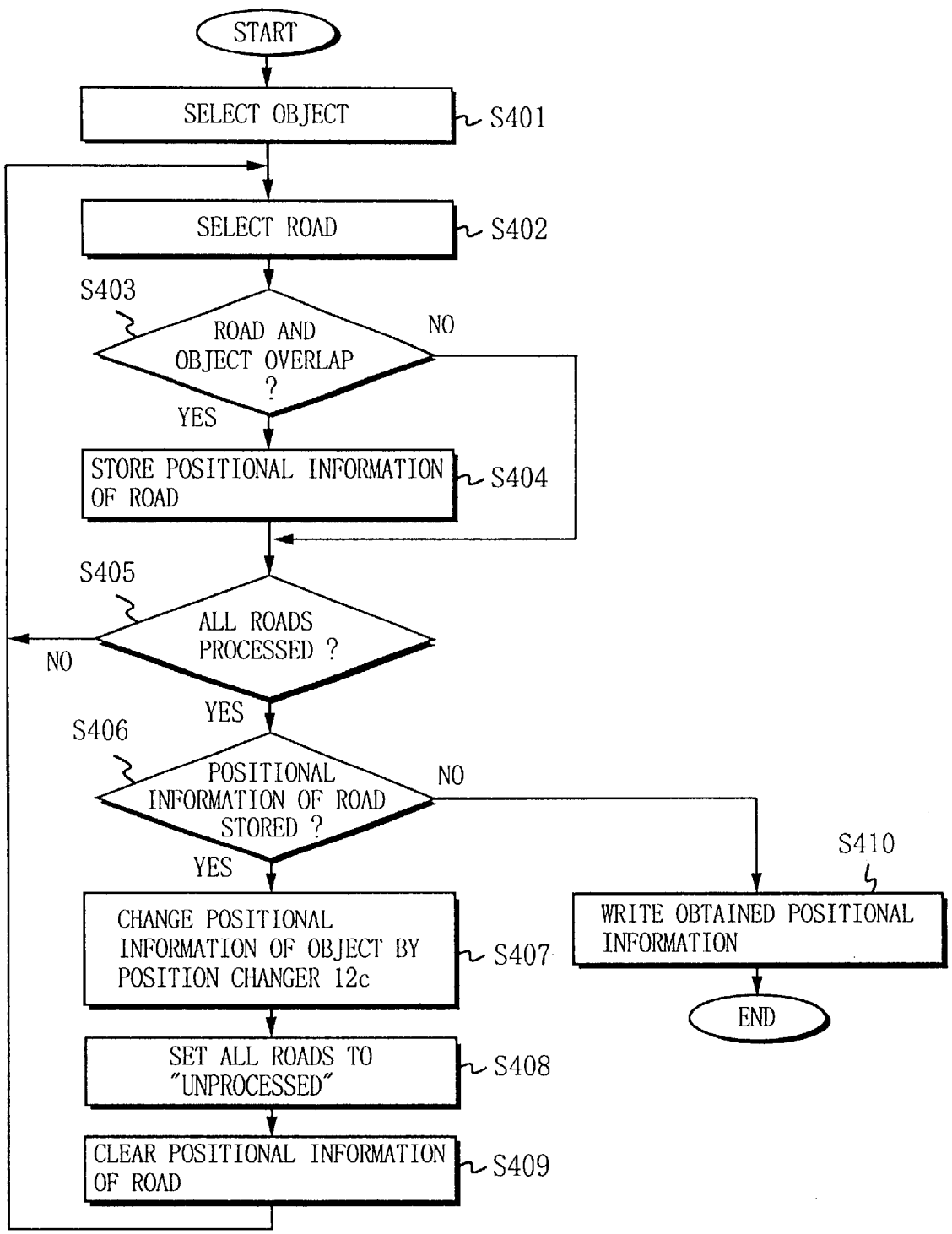
FIG. 22 is a flow chart showing the operation of the map information changing device 4 shown in FIG. 20.

The map information changing device 4 sequentially detects a road overlapping with an object, temporarily stores the positional information thereof, and changes the object in position in one process so that the object does not overlap with any stored roads. These detecting and changing processes are repeatedly carried out. With reference to a flow chart shown in FIG. 22, described is the operation of the map information changing device (hereinafter simply referred to as "device") 4 on a single object. First, the device 4 selects an object to be processed, as in the third embodiment (step S401), and then stores the positional information of a road that overlaps with the selected object in the temporary storage 16 (steps S402 to S405).

Then, the device 4 determines whether the positional information of the road(s) is stored in the temporary storage 16 (step S406). If determining in step S406 that such positional information is stored, the device 4 calculates, by using the position changer 12c, the changed object information 38 (step S407). Then, the device 4 sets all roads to be "unprocessed" (step S408), and clears the road positional information stored in the temporary storage 16 (step S409). Then, the procedure returns to step S402. Therefore, overlap determination in step S403 can be carried out on all roads repeatedly.

If determining in step S406 that the positional information is not stored, it is determined that the object has been moved to a position so as not to overlap with any roads. Therefore, the device 4 writes the object information 41 after replacement in the changed map information storage 13 (step S410). Thus, the process on the selected object is now completed.

As stated above, according to the present embodiment, the positional information of the object is changed in one process in consideration of overlaps with a plurality of roads, and also the object is gradually moved repeatedly until overlaps with all roads can be resolved. Therefore, the present embodiment has the characteristics of both the second and third embodiments, as stated above. Thus, when the map information generated by the map information changing device of the present embodiment is displayed with road width so that the objects do not overlap the roads, and a realistic screen can be presented to the user.

(Fifth Embodiment)

Figure 23:
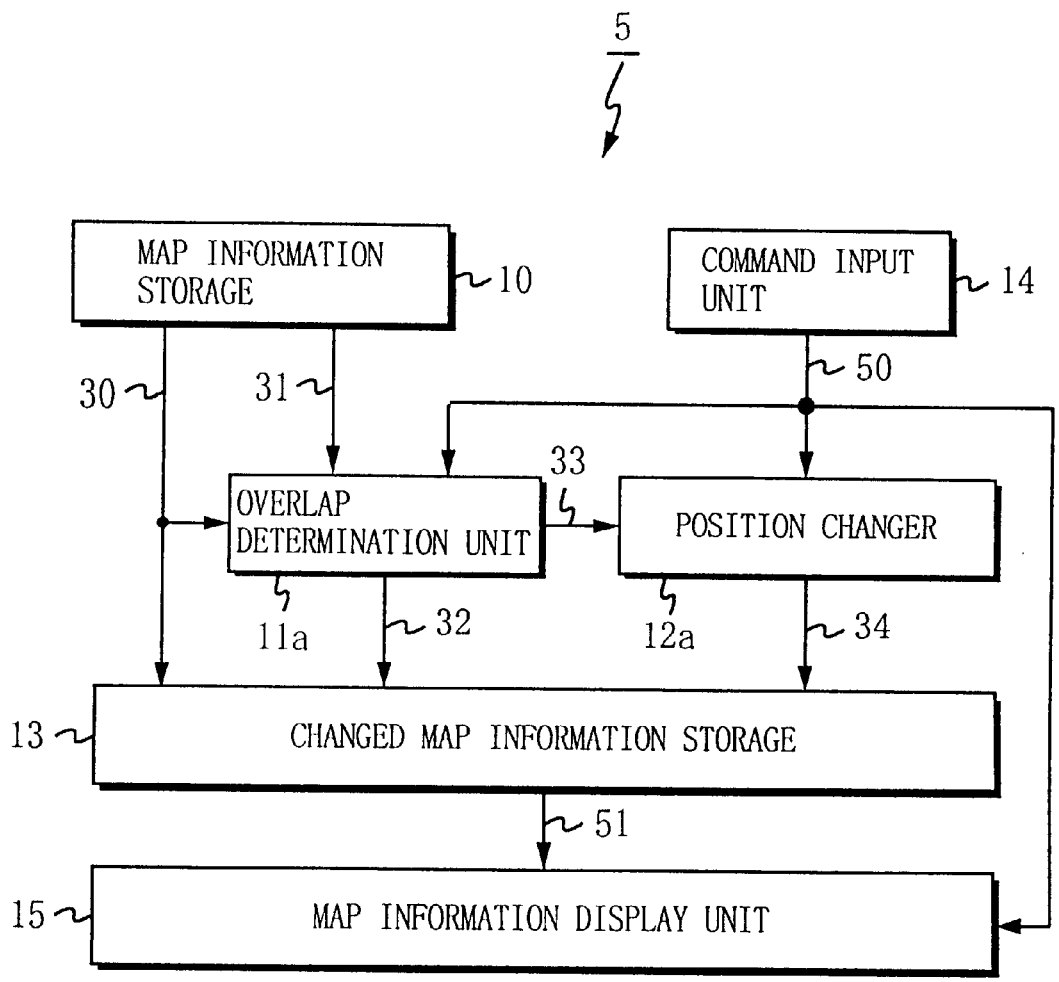
FIG. 23 is a block diagram showing the structure of a map information display device according to a fifth embodiment of the present invention.

FIG. 23 is a block diagram showing the structure of a map information display device 5 according to a fifth embodiment of the present invention. A map information display device 5 automatically converts the map information for zero-width display into the one for width display and displays the converted map information, and is used as being incorporated into a vehicle navigation device or the like, for example. The map information display device 5 includes the map information storage 10, the overlap determination unit 11a, the position changer 12a, the changed map information storage 13, a command input unit 14, and a map information display unit 15. In the present embodiment, componets identical in structure to those in the first embodiment are provided with the same reference numerals, and are not described again herein.

The command input unit 14 outputs width information 50 in response to an instruction from a user. The width information 50 indicates 0 if the user makes a "zero-width display" instruction, and indicates the predetermined road width W if the user makes a "width display" instruction. If the user makes an "enhanced width display" instruction for enhancing the width on display, the width information 50 indicates a width wider than the predetermined width W, for example, a doubled width (2×W). The width information 50 is provided to the overlap determination unit 11a, the position changer 12a, and the map information display unit 15. The overlap determination unit 11a and the position changer 12a refer to the width information to carry out processing as that in the first embodiment.

The map information display unit 15 receives the width information 50 and the changed map information 51 stored in the changed map information storage 13. The map information display unit 15 is equipped with a display such as a CRT, liquid crystal display, TV, plasma display, or hologram display. Based on the received map information, the map information display unit 15 displays the roads, landmarks, and areas simultaneously on a screen. At this time, the roads are displayed with width as required based on the width information 50.

As stated above, according to the present embodiment, whether the object included in the map information overlaps with a road on width display included in the map information is first determined. If the object overlaps with the road, the object is moved to a position at which the object does not overlap with the road on width display, while keeping its location side with respect to the center line of the road. Also, based on the original map information and the changed positional information, the roads, landmarks, and areas are simultaneously on width display. Thus, the objects are displayed so as not to overlap with the roads, and a realistic screen can be presented to the user.

Furthermore, according to the present embodiment, means for changing map information and means for displaying the changed map information are provided. Therefore, even if various widths are switched for display based on the selection by the user, the objects are always displayed so as not to overlap with the roads without requiring a plurality of map information provided in advance.

(Sixth Embodiment)

Figure 24:
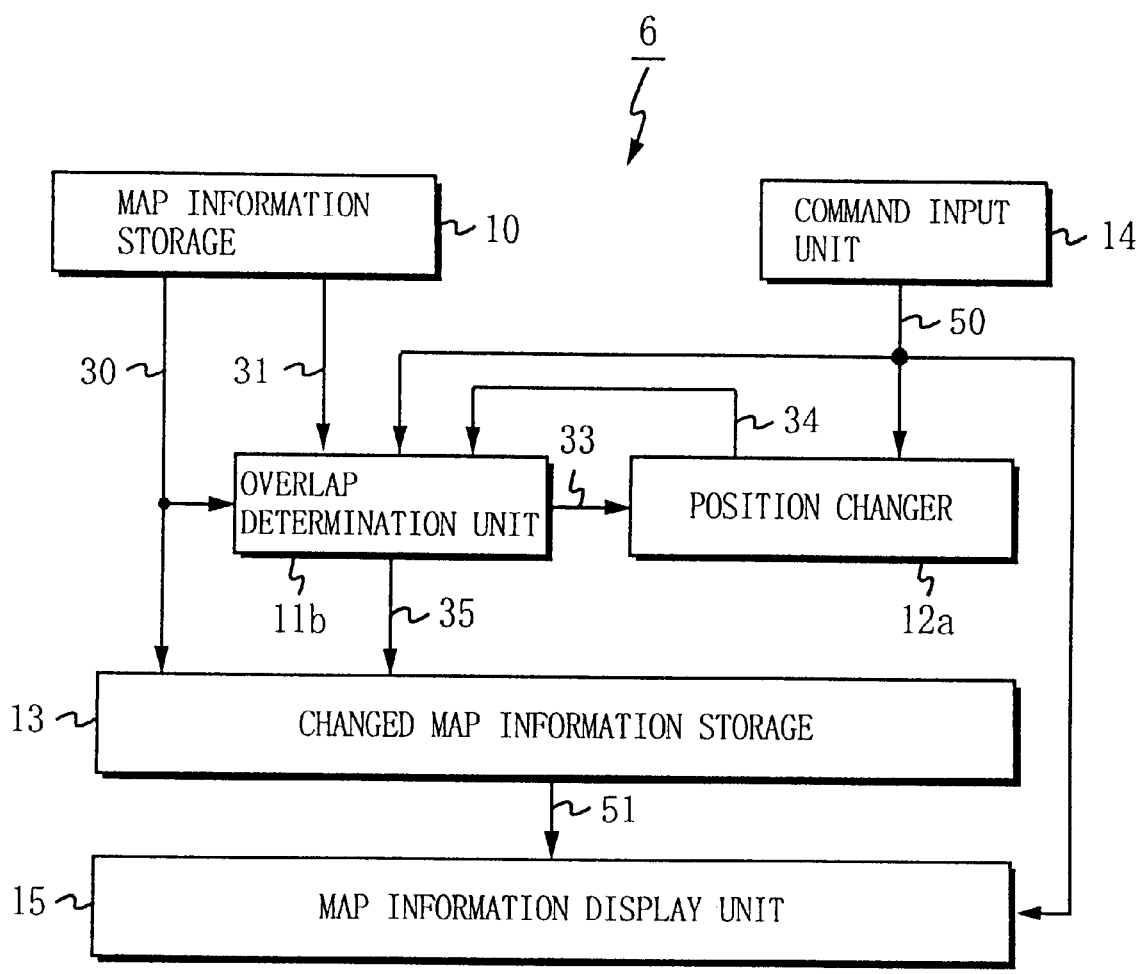
FIG. 24 is a block diagram showing the-structure of a map information display device according to a sixth embodiment of the present invention.

FIG. 24 is a block diagram showing the structure of a map information display device 6 according to a sixth embodiment of the present invention. This map information display device 6 automatically converts map information for zero-width display into the one for width display and displays the converted map information, as in the fifth embodiment, and is used as being incorporated into a vehicle navigation device, for example. The map information display device 6 is constructed by adding the command input unit 14 and the map information display unit 15 to the map information changing device 2 according to the second embodiment. Therefore, the map information display device 6 has the same characteristics as those according to the second and fifth embodiments. The details on the map information display device 6 are thus evident from the above description of these embodiments, and are not described herein.

As stated above, the map information display device according to the present embodiment has the same characteristics as those according to the second and fifth embodiments. That is, the map information display device can gradually change the positional information, and can display the map information based on the road width information provided by the user. Therefore, even if the map information is displayed with the road width being switched based on the selection by the user, the objects are displayed so as not to overlap with any roads, and a realistic screen can be presented to the user.

(Seventh Embodiment)

Figure 25:
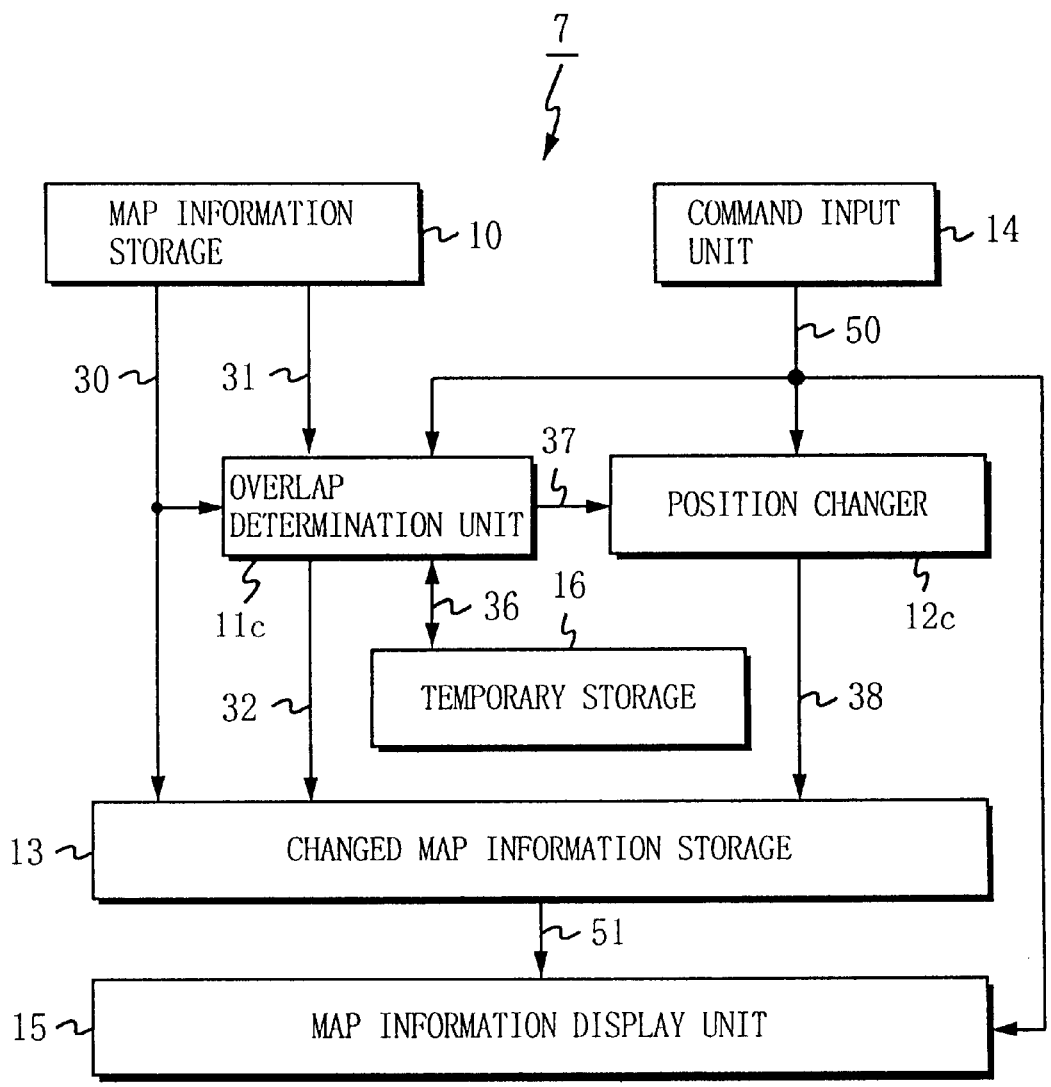
FIG. 25 is a block diagram showing the structure of a map information display device according to a seventh embodiment of the present invention.

FIG. 25 is a block diagram showing the structure of a map information display device 7 according to a seventh embodiment of the present invention. This map information display device 7 automatically converts map information for zero-width display into the one for width display and display the converted map information, as in the fifth embodiment, and is used as being incorporated into a vehicle navigation device, for example. The map information display device 7 is constructed by adding the command input unit 14 and the map information display unit 15 to the map information changing device 3 according to the third embodiment.

Therefore, the map information display device 7 has the characteristics of those according to the third and fifth embodiments. The details on the map information display device 7 are thus evident from the above description of these embodiments, and are not described herein.

As stated above, the map information display device according to the present embodiment has the same characteristics as those according to the third and fifth embodiments. That is, the map information display device can change the positional information in one process in consideration of overlaps with a plurality of roads, and can display the map information based on the road width information provided by the user. Therefore, even if the map information is displayed with the road width being switched based on the selection by the user, the objects are displayed so as not to overlap with roads, and a realistic screen can be presented to the user.

(Eighth Embodiment)

Figure 26:
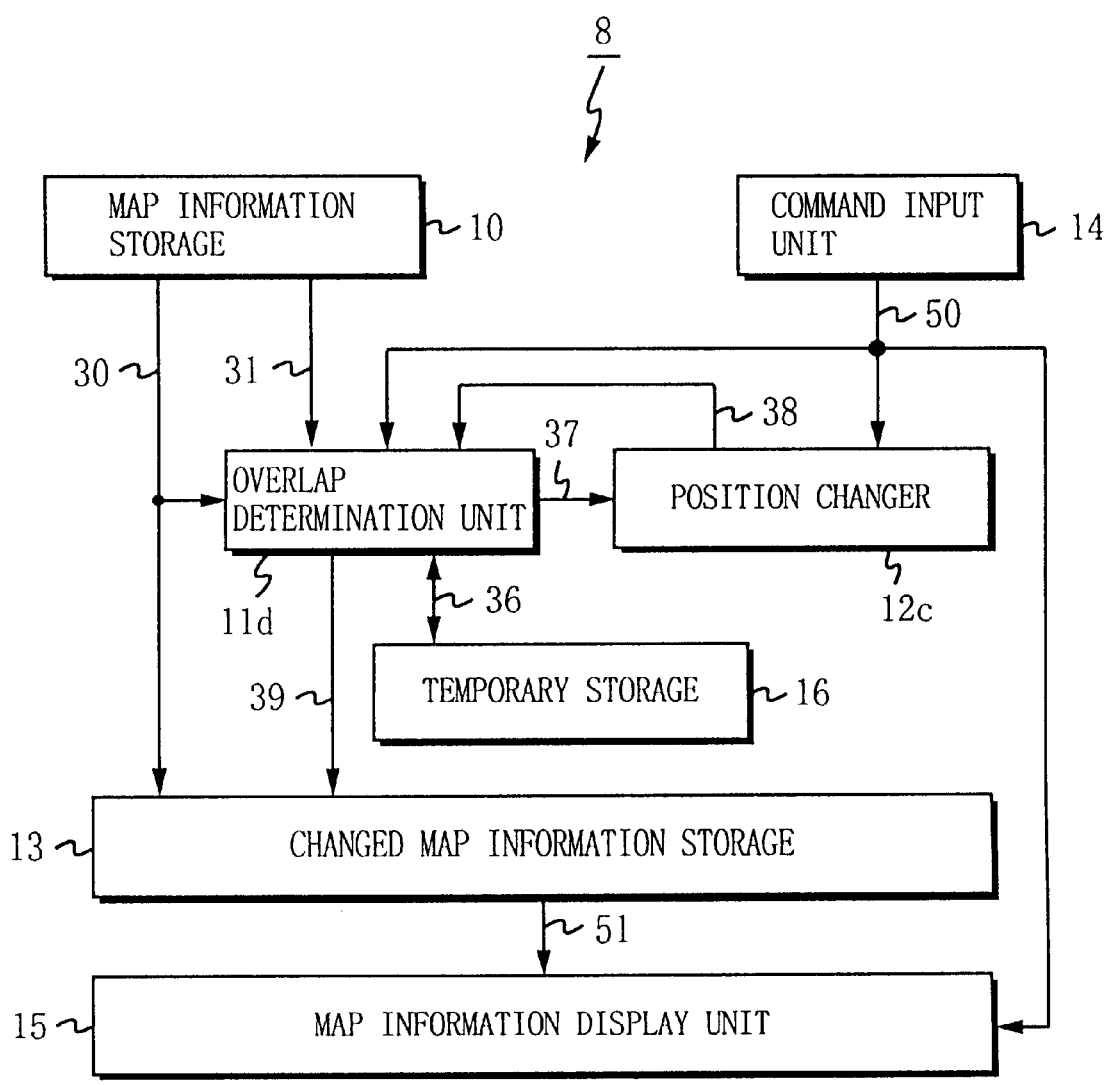
FIG. 26 is a block diagram showing the structure of a map information display device according to an eighth embodiment of the present invention.
Figure 27A:
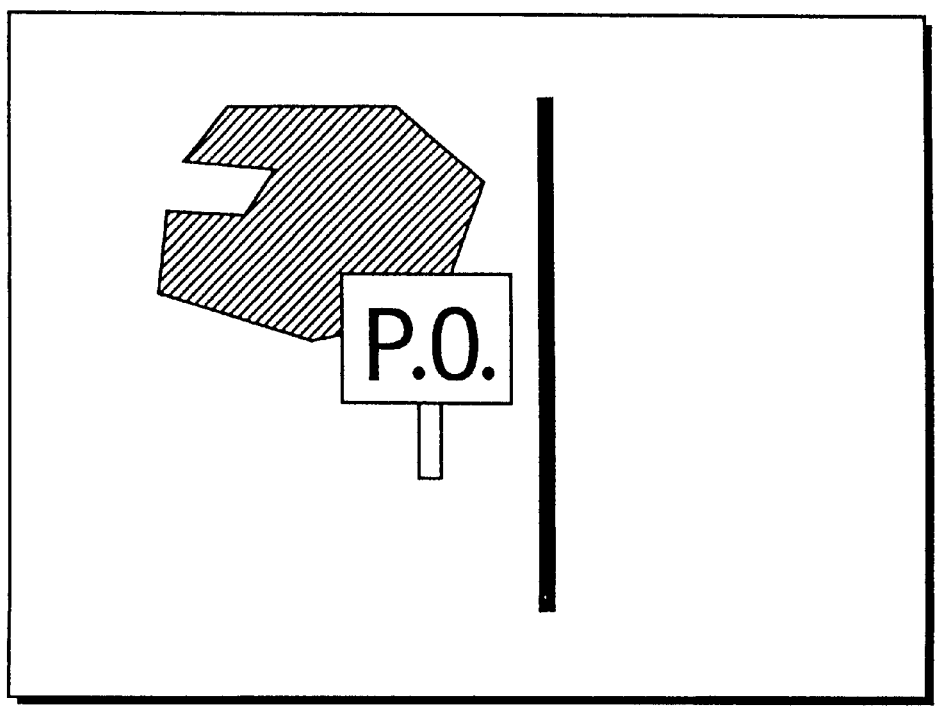
FIGS. 27a and 27b are diagrams each showing an example of a display screen with the use of conventional map information.
Figure 27B:
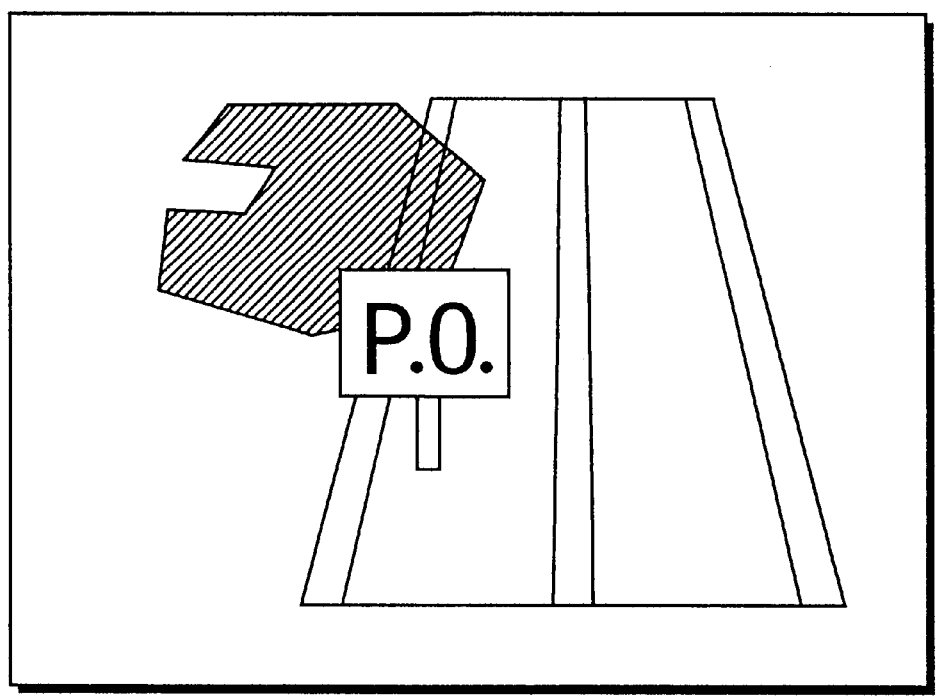

FIG. 26 is a block diagram showing the structure of a map information display device 8 according to an eigth embodiment of the present invention. This map information display device 8 automatically converts map information for zero-width display into the one for width display and displays the converted map information, as in the fifth embodiment, and is used as being incorporated into a vehicle navigation device, for example. The map information display device 8 is constructed by adding the command input unit 14 and the map information display unit 15 to the map information changing device 4 according to the fourth embodiment. Therefore, the map information display device 8 has the same characteristics as those according to the second, third, and fifth embodiments. The details on the map information display device 8 are thus evident from the above description of these embodiments, and are not described herein.

As stated above, the map information display device according to the present embodiment has the same characteristics as those according to the second, third, and fifth embodiments. That is, the map information display device can gradually change the positional information, can change the positional information in one process in consideration of overlaps with a plurality of roads, and can display the map information based on the road width information provided by the user. Therefore, even if the map information is displayed with the road width being switched based on the selection by the user, the objects are displayed so as not to overlap with any roads, and a realistic screen can be presented to the user.

In the first, second, fifth, and sixth embodiments, the position of the landmark and each vertex of the area are moved in a direction perpendicular to the road. Alternatively, they may be moved in a direction approximately perpendicular to the road. This can also achieve the same effects as those described in the above embodiments.

Furthermore, in the second or fourth, and sixth or eighth embodiments, the object can be changed in position without limitation so as not to overlap with a plurality of roads. Alternatively, the changed positional information may be compared with the original one, and if a difference therebetween is more than a predetermined value (50 meters, for example) , the original one is used. Such limitation can prevent erroneous changes in the positional information.

In either of the above first through eighth embodiments, the overlapping landmark and area are changed in position. Alternatively, the overlapping road may be changed in position. If the map information for zero-width display is a detailed city map generated based on an aerial photograph, for example, the landmarks and areas are first defined in position by using their shapes on the photograph, and their positional information are used as a reference in the map information. With reference thereto, the positional information of the road may be changed. To change the position of the road, the road to a position perpendicular to its original position or only one endpoint of a segment composing the road may be moved to a position perpendicular to the road. These methods can also achieve the same effects as those described in the above embodiments.

While the invention has been described in detail, the foregoing description is in all aspects illustrative and not restrictive. It is understood that numerous other modifications and variations can be devised without departing from the scope of the invention.

What is claimed is:

1. A map information changing device for changing positions of landmarks and areas, wherein the landmarks, the areas, and roads are included in map information, said device comprising:

a map information storage device operable to store the map information at least related to the roads, the landmarks, and the areas;

an overlap determination device operable to determine whether the landmark and the area included in the map information overlap, on a two-dimensional plane of a map, with one or more of the roads included in the map information and displayed with a road width;

a position change device operable to change positional information of the landmark and the area determined by said overlap determination device as overlapping with one or more roads by moving each of the landmark and the area to a position at which each of the landmark and the area does not overlap, on the two-dimensional plane of the map, with the one or more roads displayed with the road width, while maintaining a location side of each of the landmark and the area with respect to a center line of each of the one or more roads; and a changed map information storage device operable to store the map information and the positional information of the landmark and the area changed by said position change device.

2. The map information changing device according to claim 1, wherein said position changing device is operable to move the landmark away from the center line of each of the one or more roads.

3. The map information changing device according to claim 1, wherein said position change device is operable to move each vertex of the area away from the center line of each of the one or more roads.

4. The map information changing device according to claim 3, wherein said position change device is operable to deform the area in a direction away from the center line of each of the one or more roads.

5. The map information changing device according to claim 3, wherein said position change device is operable to translate the area away from the center line of each of the one or more roads.

6. The map information changing device according to claim 1, further comprising:

a map information display device operable to display, on a screen, the changed map information stored in said changed map information storage device with the road width.

7. The map information changing device according to claim 6, wherein said overlap determination device and said position change device are operable to switch the road width to another road width based on an input from a user.

8. The map information changing device according to claim 1, wherein said overlap determination device comprising:

a road width calculator operable to calculate a road width (W) of a road included in the map information;

a size calculator operable to calculate a size (L) of at least one of the landmark and the area included in the map information; and an overlap calculator operable to calculate a distance (D) between the road and at least one of the landmark and the area, and operable to determine, based on the road width (W), the size (L), and the distance (D), whether at least one of the landmark and the area overlap with the road.

9. A method for changing positions of landmarks and areas, wherein the landmarks, the areas, and roads are included in map information, said method comprising:

storing the map information at least related to the roads, the landmarks, and the areas;

determining whether the landmark and the area included in the map information overlap, on a two-dimensional plane of a map, with one or more of the roads included in the map information and displayed with a road width;

changing positional information of the landmark and the area determined in said determining as overlapping with one or more roads by moving each of the landmark and the area to a position at which each of the landmark and the area does not overlap, on the two-dimensional plane of the map, with the one or more roads displayed with the road width, while maintaining a location side of each of the landmark and the area with respect to a center line of each of the one or more roads; and storing the map information and the positional information of the landmark and the areas changed in said changing.

10. The map information changing method according to claim 9, wherein in said changing, the landmark is moved away from the center line of each of the one or more roads.

11. The map information changing method according to claim 9, wherein in said changing, each vertex of the area is moved away from the center line of each of the one or more roads.

12. The map information changing method according to claim 11, wherein in said changing, the area is deformed in a direction away from the center line of each of the one or more roads.

13. The map information changing method according to claim 11, wherein in said changing, the area is translated away from the center line of each of the one or more roads.

14. A map information changing device for changing positions of roads, wherein the roads, landmarks, and areas are included in map information, said device comprising:

a map information storage device operable to store the map information at least related to the roads, the landmarks, and the areas;

an overlap determination device operable to determine whether a road included in the map information and displayed with a road width overlaps, on a two-dimensional plane of a map, with one or more of the landmarks and the areas included in the map information;

a position change device operable to change positional information of the road determined by said overlap determination device as overlapping with one or more landmarks and areas by moving the road displayed with the road width to a position at which the road does not overlap, on the two-dimensional plane of the map, with the one or more landmarks and areas, while maintaining a location side of each of the landmarks and the areas with respect to a center line of the road; and a changed map information storage device operable to store the map information and the positional information of the road changed by said position change device.

15. The map information changing device according to claim 14, wherein said position change device is operable to move each endpoint of a segment composing the road away from the one or more landmarks and areas.

16. The map information changing device according to claim 15, wherein said position change device is operable to translate the road away from the one or more landmarks and areas.

17. The map information changing device according to claim 15, wherein said position change device is operable to move one endpoint of the segment composing the road away from the one or more landmarks and areas.

18. The map information changing device according to claim 14, further comprising a map information display device operable to display, on a screen, the changed map information stored in said changed map information storage device with the road width.

19. The map information changing device according to claim 18, wherein said overlap determination device and said position change device are operable to switch the road width to another road width based on an input from a user.

20. The map information changing device according to claim 14, wherein said overlap determination device comprises:

a road width calculator operable to calculate a road width (W) of a road included in the map information;

a size calculator operable to calculate a size (L) of at least one of the landmark and the area included in the map information; and an overlap calculator operable to calculate a distance (D) between the road and at least one of the landmark and the area, and operable to determine, based on the road width (W), the size (L), and the distance (D), whether the road overlaps with at least one of the landmark and the area.

21. A method for changing positions of roads, wherein the roads, landmarks, and areas are included in map information, said method comprising:

storing the map information at least related to the roads, the landmarks, and the areas;

determining whether the road included in the map information and displayed with a road width overlaps, on a two-dimensional plane of a map, with one or more of the landmarks and the areas included in the map information;

changing positional information of the road determined in said determining as overlapping with one or more landmarks and areas by moving the road displayed with the road width to a position at which the road does not overlap, on the two-dimensional plane of a map, with the one or more landmarks and areas, while maintaining a location side of each of the landmarks and the areas with respect to a center line of the road; and storing the map information and the positional information of the road changed in said changing.

22. The map information changing method according to claim 21, wherein in said changing, each endpoint of a segment composing the road is moved away from the one or more landmarks and areas.

23. The map information changing method according to claim 22, wherein in said changing, the road is translated away from the one or more landmarks and areas.

24. The map information changing method according to claim 22, wherein in said changing, one endpoint of the segment composing the road is moved away from the one or more landmarks and areas.

25. A navigation device for providing guidance to users, wherein landmarks, areas, and roads are included in map information, said device comprising:

a map information storage device operable to store the map information at least related to the roads, the landmarks, and the areas;

an overlap determination device operable to determine whether the landmark and the area included in the map information overlap, on a two-dimensional plane on a map, with the one or more of the roads included in the map information and displayed with a road width;

a position change device operable to change positional information of the landmark and the area determined by said overlap determination device as overlapping with one ore more roads by moving each of the landmark and the area to a position at which each of the landmark and the area does not overlap, on the two-dimensional plane of the map, with the one or more roads displayed with the road width, while maintaining a location side of each of the landmark and the area with respect to a center line of each of the one or more roads;

a changed map information storage device operable to store the map information and the positional information of the landmark and the area changed by said position change device; and a map information display device operable to display, on a screen, the changed map information stored in said changed map information storage device with the road width.

26. The navigation device according to claim 25, wherein said overlap determination device comprises:

a road width calculator operable to calculate a road width (W) of a road included in the map information;

a size calculator operable to calculate a size (L) of at least one of the landmark and the area included in the map information; and an overlap calculator operable to calculate a distance (D) between the road and at least one of the landmark and the area, and operable to determine, based on the road width (W), the size (L), and the distance (D), whether at least one of the landmark and the area overlap with road.

27. A navigation device for providing guidance to users, wherein landmarks, areas, and roads are included in map information, said device comprising:

a map information storage device operable to store the map information at least related to the roads, the landmarks, and the areas;

an overlap determination device operable to determine whether a road included in the map information and displayed with a road width overlaps, on a two-dimensional plane of a map, with one or more of the landmarks and the areas included in the map information;

a position change device operable to change positional information of the road determined by said overlap determination device as overlapping with one or more landmarks and areas by moving the road displayed with the road width to a position at which the road does not overlap, on the two-dimensional plane of the map, with the one or more landmarks and areas, while maintaining a location side of each of the landmarks and the areas with respect to a center line of the road;

a changed map information storage device operable to store the map information and the positional information of the road changed by said position change device; and a map information display device operable to display, on a screen, the changed map information stored in said changed map information storage device with the road width.

28. The navigation device according to claim 27, wherein said overlap determination device comprises:

a road width calculator operable to calculate a road width (W) of a road included in the map information;

a size calculator operable to calculate a size (L) of at least one of the landmark and the area included in the map information; and an overlap calculator operable to calculate a distance (D) between the road and at least one of the landmark and the area, and operable to determine, based on the road width (W), the size (L), and the distance (D), whether the road overlaps with at least one of the landmark and the area.

* * * * *

UNITED STATES PATENT AND TRADEMARK OFFICE
CERTIFICATE OF CORRECTION

PATENT NO.     : 6,449,557 B2
DATED          : September 10, 2002
INVENTOR(S)    : Teruaki Ata et al.

It is certified that error appears in the above-identified patent and that said Letters Patent is hereby corrected as shown below:

Column 21,
Line 43, replace "changing" with -- change --.

Column 22,
Line 3, replace "comprising" with -- comprises --.
Line 35, replace "areas" with -- area --.

Column 24,
Line 24, replace "ore" with -- or --.

Signed and Sealed this

Twenty-first Day of January, 2003

JAMES E. ROGAN
*Director of the United States Patent and Trademark Office*